United States Patent [19]

Wurst

[11] 4,001,514
[45] Jan. 4, 1977

[54] SUBSCRIBER DIGITAL MULTIPLEXING SYSTEM WITH TIME DIVISION CONCENTRATION

[75] Inventor: Walter Kenneth Wurst, Guelph, Canada

[73] Assignee: ITT Canada, Limited, Toronto, Canada

[22] Filed: Dec. 9, 1974

[21] Appl. No.: 530,954

[52] U.S. Cl. .................. 179/18 FC; 179/18 FG; 179/15 AT

[51] Int. Cl.$^2$ .................................. H04M 7/14

[58] Field of Search ........ 179/15 A, 15 AT, 15 BS, 179/15 BY, 18 FC, 18 FG, 18 FF; 178/69.5 R

[56] References Cited

UNITED STATES PATENTS

| | | | |
|---|---|---|---|
| 3,492,435 | 1/1970 | Inose | 179/18 FC |
| 3,576,399 | 4/1971 | Schweitzer | 179/18 FG |
| 3,781,485 | 12/1973 | Woodward | 179/18 FG |
| 3,790,713 | 2/1974 | Neufang | 179/15 AT |
| 3,856,993 | 12/1974 | Closs | 179/15 BY |

Primary Examiner—David L. Stewart
Attorney, Agent, or Firm—J. B. Raden; M. M. Chaban

[57] ABSTRACT

A digital multiplexer for transmitting control, signaling and speech information in digital form between a central telecommunications office (CO) and a plurality of remote terminals. The system serves a plurality of lines at the exchange and couples those lines to subscriber stations associated with those lines through a digital span line such as the generally known Tl line between a CO terminal and the remote terminals. A maximum of 32 channels are provided using continuously variable slope delta modulation, with the modulation and demodulation being performed in line circuits individual to each line being served. A time division concentration stage enables the system to service 128 lines over the 32 channels with each channel having a memory position for storage of line address information.

10 Claims, 30 Drawing Figures

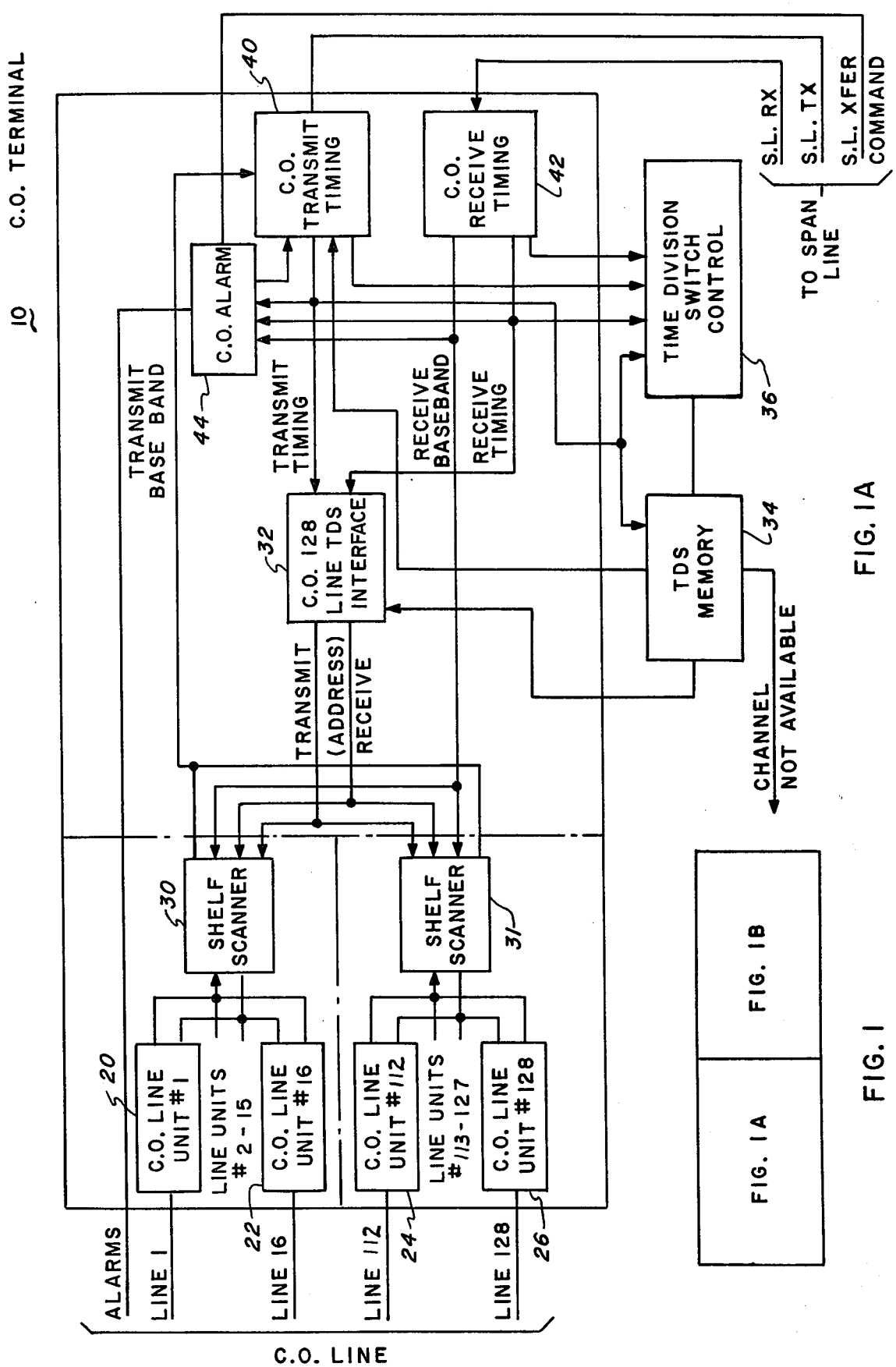

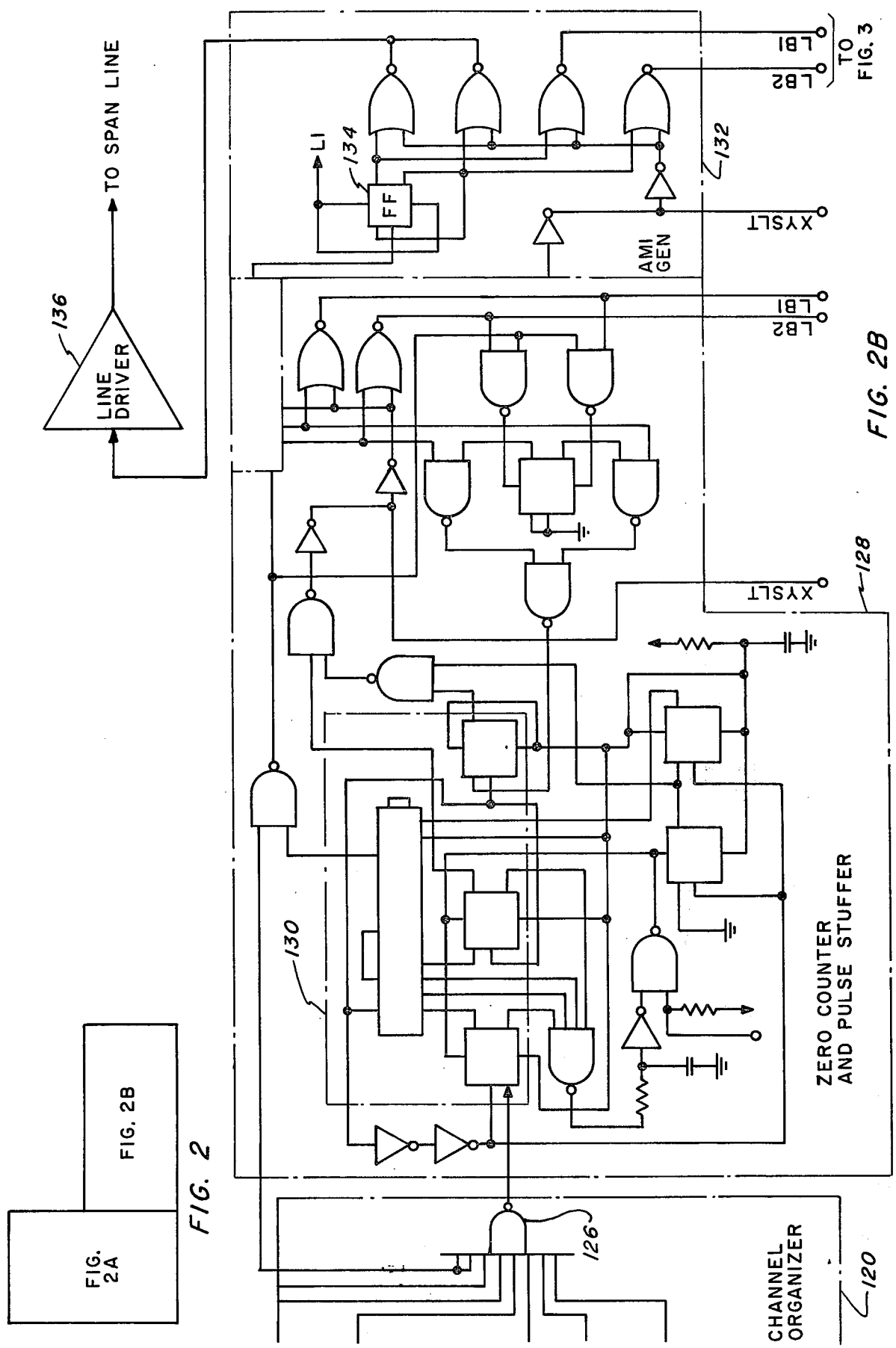

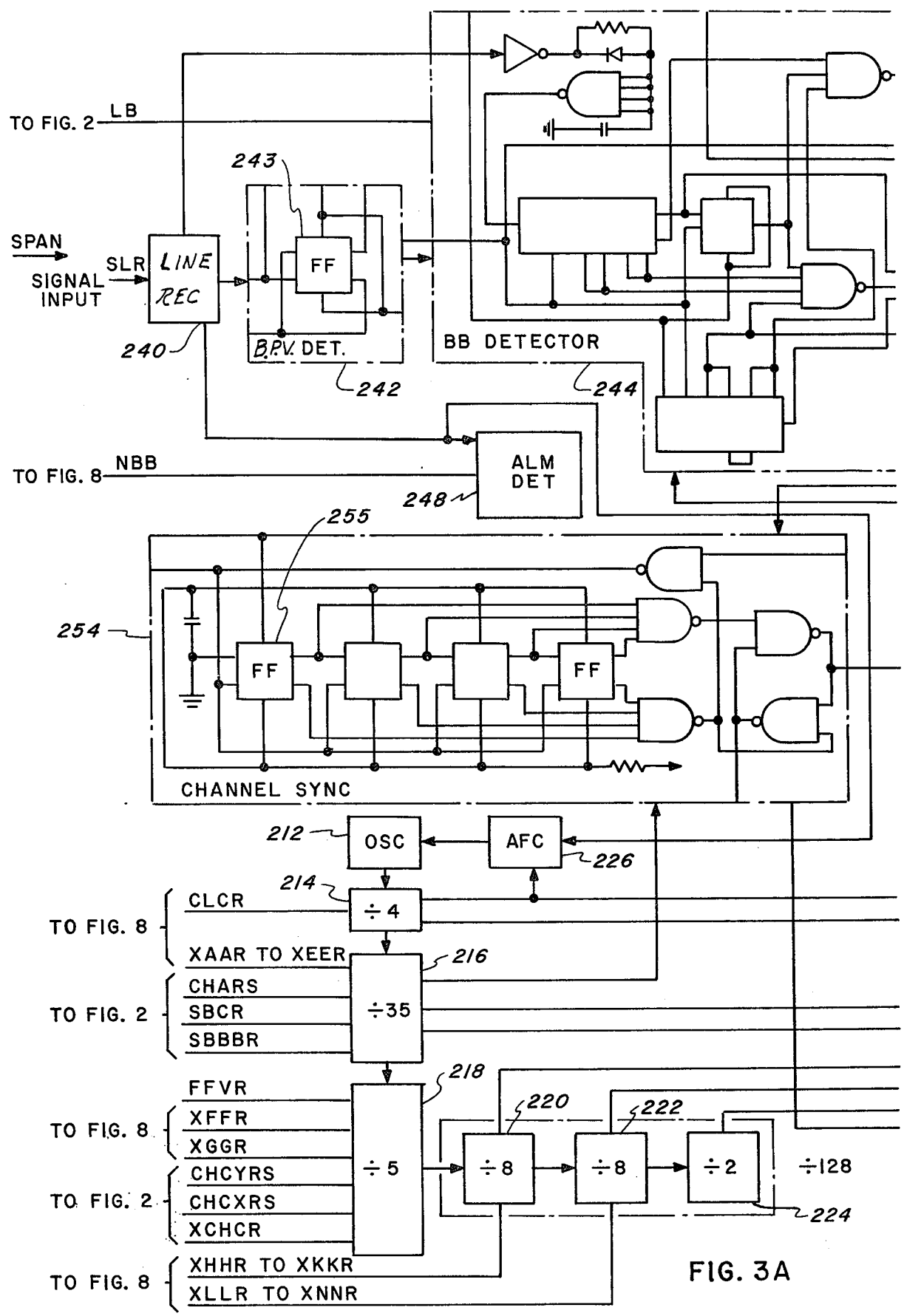

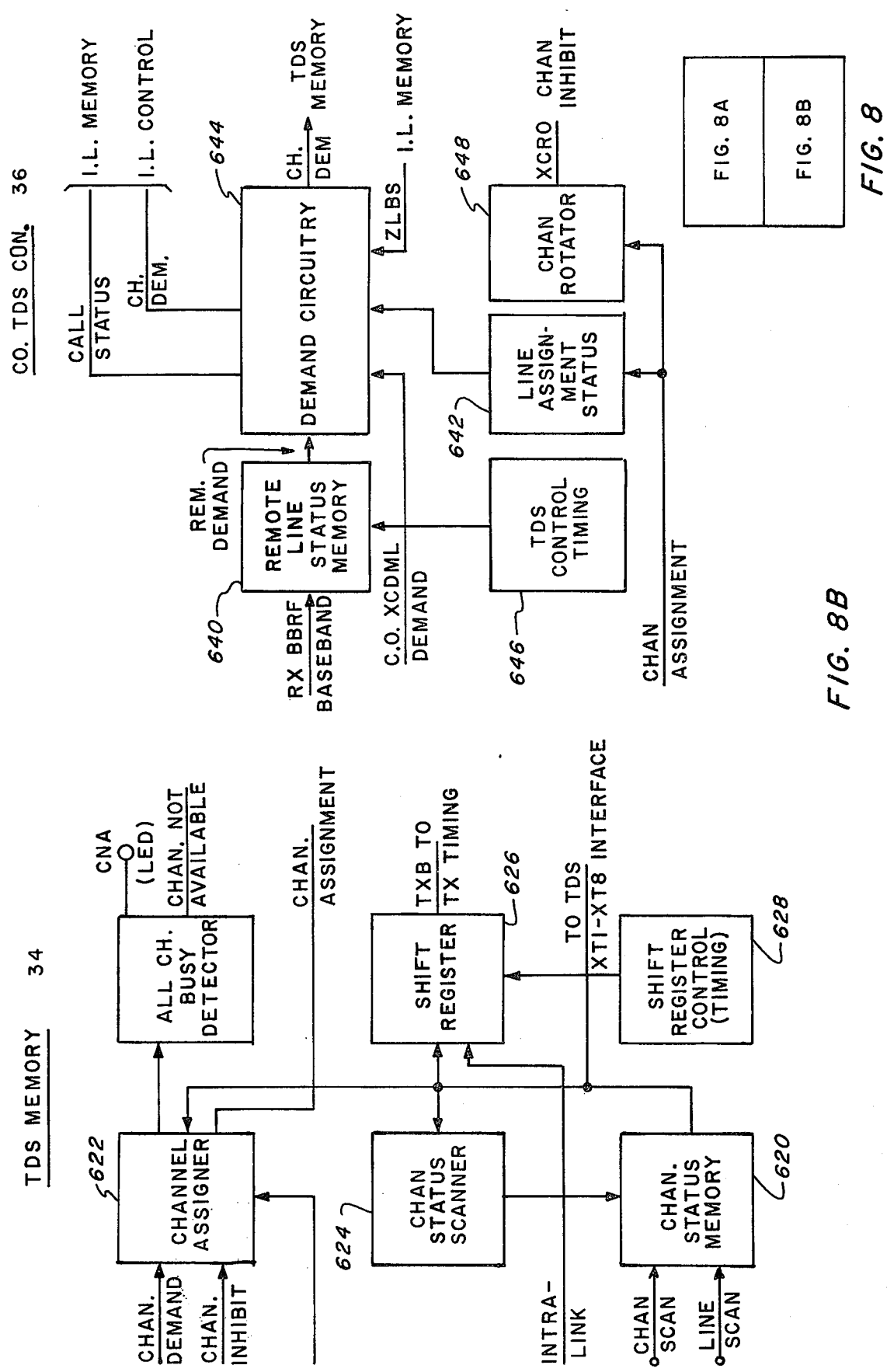

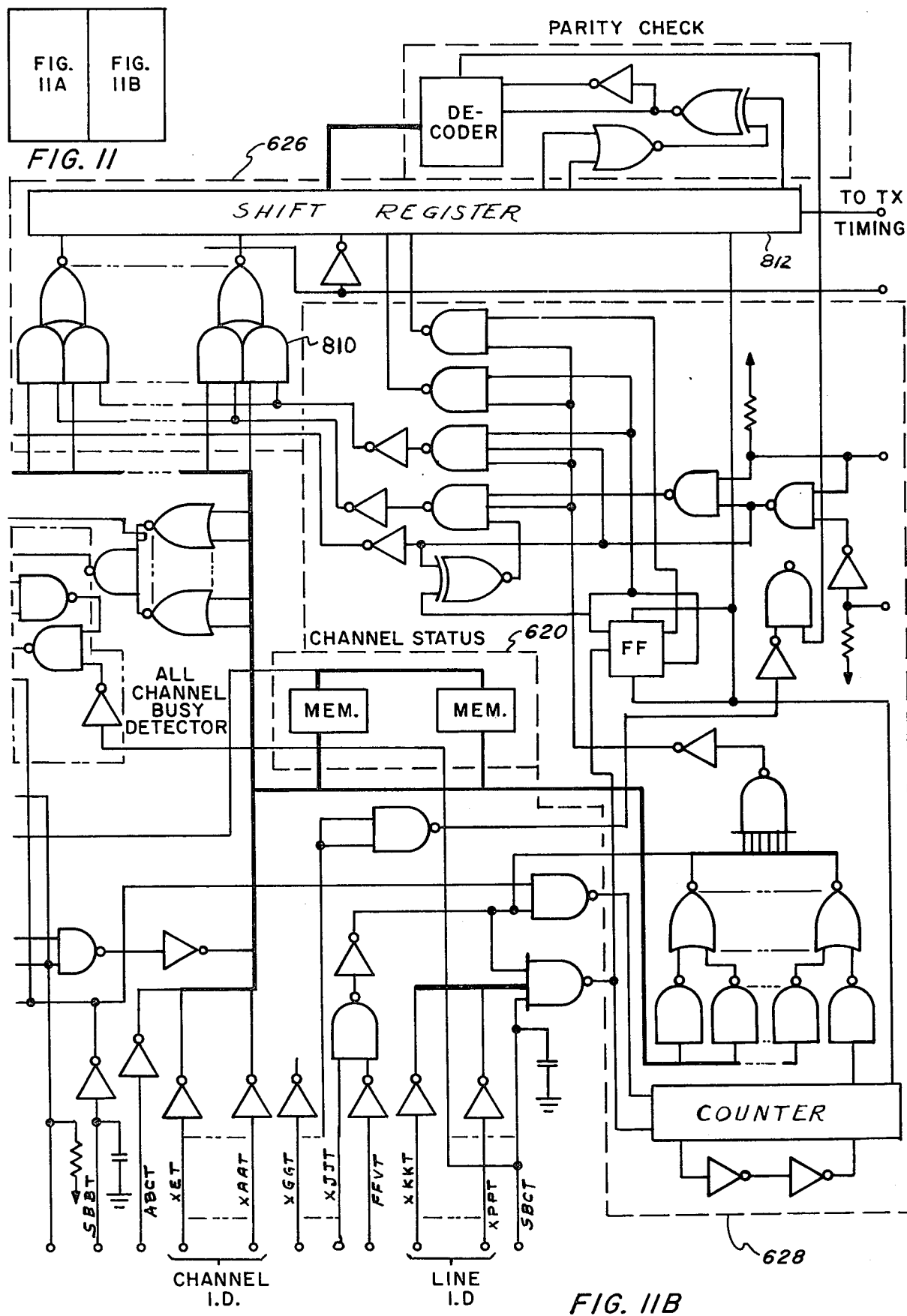

SUBSCRIBER DIGITAL MULTIPLEXING SYSTEM WITH TIME DIVISION CONCENTRATION

BACKGROUND OF THE INVENTION

Subscriber line digital multiplexers are well-known; for example, there is the SLM (Subscriber Line Multiplexer) system being manufactured and sold by the Bell System in the U.S. and described generally in the Bell Laboratories Record for March, 1972 on pages 80–86 in an article by I.M. McNair. This system includes combined time division transmission and space division crossbar switching at the central office terminal. Adaptive delta modulation is used for digital data transmission across a span to a remote terminal for demodulation and passage over a wire path to the subscriber. Space division concentration from a maximum of eighty lines is provided for the 24 channels or trunks using crossbar switches. A number of similar systems are on sale in the U.S. at the present time, these primarily being PCM systems using twenty-four channels with a limited number of remote terminals available.

SUMMARY OF THE INVENTION

The simplest form of the present system includes three sections: A central office terminal, at least one remote terminal, and a digital span line which may be of the well-known Tl carrier transmission type, the span line extending between the CO terminal and the remote terminal. The basic system shown is capable of time-division multiplexing and demultiplexing up to 32 two-wire analog subscriber loops. By providing a time division switching stage as disclosed herein, the line capacity of the system is expanded to a maximum of 128 lines, the lines being located at as many as eight remote terminals.

The central office terminal is preferably located in or near a central office and connects to the line end CO apparatus for call processing. The remote terminal or terminals are spaced a distance from the CO, the distance being one which makes it economical to use a repeatered span line as set forth in the SLM system article noted. The remote terminals are connected preferably by wire connection to local subscriber stations.

My disclosed system employs continuously variable slope delta modulation at the line circuits representing each line, using a modulator and demodulator of the type shown in Canadian Pat. No. 935,581 issued Oct. 10, 1973. This type of delta modulation uses less bandwidth to obtain performance comparable to that of existing 7-digit PCM equipment designed for similar applications. The disclosed system allows 32 channels to be multiplexed using the same bandwidth as used by 24 channel PCM equipment of existing design. This delta modulation technique, using sampling frequency sampling of 44.1 KHz provides a signal to quantizing noise ratio that is comparable to that of seven-digit PCM of existing design. The delta modulator provides slightly better signal-to-noise ratio at talking level than this PCM but a slightly worse ratio at low levels. One important advantage over PCM, however, is in idle channel noise where the idle channel noise is specified as 28 dbrnc with typical values of 18 dbrnc. The basic system is specified as 8 dbrnc with values less than 0 dbrnc being measured in the laboratory.

The inclusion of the electronic concentrator or time division switching feature of the present invention provides system capacity of up to 128 subscriber lines which may be multiple party lines. The concentration feature is provided by adding to the basic system a time division switch (TDS) control unit, a TDS memory for storing the addresses of lines being associated with the respective channels, a larger capacity interface unit at the CO end and a TDS switch at each remote terminal. Each of the 128 subscriber loops has full access to any of the 32 channels.

The traffic handling capability of the system may be further enhanced by adding an additional three signal processing units to the electronic cncentrator at the CO terminal. These three units give the TDS the capibility of switching two lines directly together at the Remote Terminal if a connection between them is initially made through the central office switching equipment. This optional intralink capability enables two interterminal channels to be made available under these circumstances for additional traffic. A total of 16 intralinks can be made available to the system. This allows for a maximum of 64 lines to be simultaneously using the system under certain conditions, even though only 32 channels are available.

As mentioned previously, the basic system may use a conventional Tl repeatered span line to provide the connection between the CO and remote terminals. Signals are generated at the standard 1.544 MHz bit rate at the CO and are converted to AMI or bipolar form for transmission down the TI grade cable. Although framing standards and signal make-up used herein are not the same as those used on regular PCM, the system may operate with standard repeatered lines.

Because the system utilizes delta modulation in its digitizing process, each active line unit need only be sampled once per transmitted frame interval. This frame interval corresponds to the digitizer sampling rate in which each frame contains 35 time allocations, each one the length of one 1.544 MHz bit period or approximately 648 nanoseconds. Each time allocation takes the form of one system trunk channel and because the total number of trunk channels is 32, three channels are available per frame for interterminal signalling and timing control functions. A controlled bipolar violation pattern is used to provide frame synchronization.

The system disclosed can be configured using one CO terminal and up to eight remote terminals. Alarm facilities can be provided at each terminal to monitor and display local terminal operational status. Light-emitting diodes are used to display loss of incoming signal, loss of frame synchronization, spare span line in use and factors pertaining to the remote terminal such as voltages out of tolerance.

An error-rate counter may be provided at each terminal to total incoming bipolar violations over fixed time intervals and give an approximate error-rate indication on a diode display. Provisions may be made at the CO terminal to monitor and respond to the alarm status of each remote terminal individually and to isolate a faulty remote terminal from the system.

The concentration option shown is capable of assigning a maximum of 128 subscriber lines to 32 end-to-end channels on a first-come, first-served basis. Because each subscriber line is connected to a separate line unit which performs all termination and digitization functions, concentration becomes a relatively simple switching problem. The switching is performed by a time division switching network (TDS) located in the common control at the CO terminal.

The TDS network includes three circuits — an interface unit, a memory unit and a control logic unit. The network accomplishes its line unit selection by assigning an eight-bit memory word to each line unit, and storing the address of the line unit in a position representing the channel assigned to handle the call. This channel information controls the line unit selection at the CO terminal directly and is also transmitted to the remote terminals to select the corresponding subscriber line unit.

An unused channel can be accessed from line units located at any terminal. When an incoming ring is detected at the central office, or when a subscriber at a remote terminal goes off-hook, the condition is detected by the common control as soon as a line scanner has interrogated the active line unit. A channel access request is sent to the TDS network causing it to assign a vacant channel to the line unit by transferring the line unit address from the scanner to the appropriate channel memory location in the TDS memory. Channel assignments are made on a rotational basis, ensuring that all 32 channels are selected even during light traffic conditions.

Line loop back checking capability may be provided at all terminals enabling adjacent line units to be checked for VF continuity even though the span line is not operational. During normal system operation, the loop back test only disrupts the remote terminal where it is being used. This allows all other terminals to remain operational even though one remote terminal is under test. Operation of the entire system will be interrupted if the CO terminal is looped back.

It is therefore an object of the invention to provide an improved central office to subscriber line multiplexer using digital techniques throughout.

It is another object of the invention to provide a subscriber line system in which there is full access time division concentration of lines to a channel for digital transmission of signals across the channel and reconstruction of said signals into supervisory controls and speech information.

It is still another object of the invention to provide an improved time division multiplex communication system with a plurality of remote terminals having access in parallel to a single central office terminal.

It is a further object of the invention to provide a system using a plurality of stages of decoding to minimize the intra-stage wiring necessary.

DETAILED DESCRIPTION OF THE DRAWINGS

SYSTEM BLOCK DIAGRAM

Figure 1B:
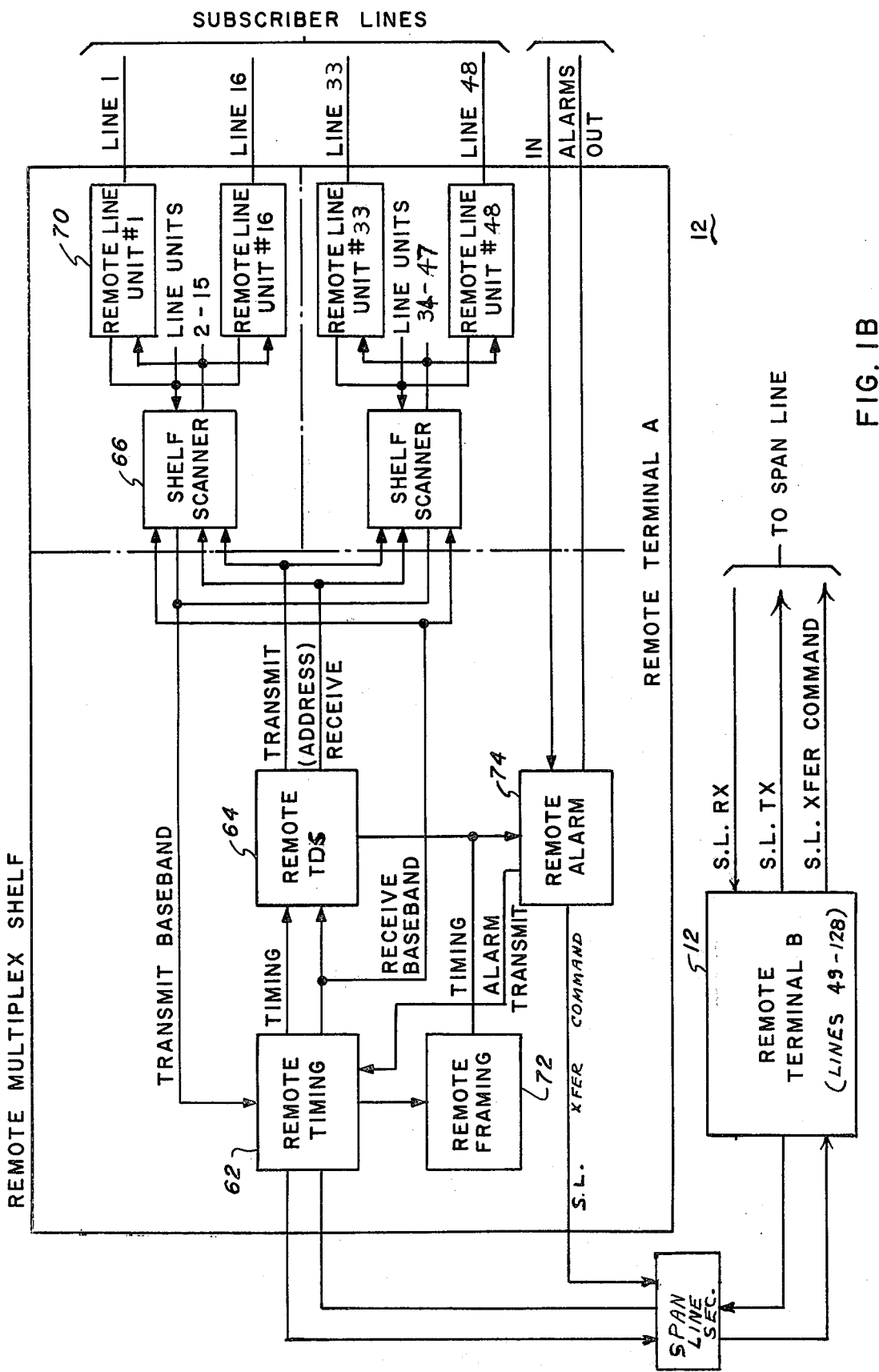
FIG. 1 is a schematic diagram of a system employing my invention, and including a central office (CO) terminal unit (FIG. 1A) and a remote terminal office (FIG. 1B)

In FIGS. 1A and 1B, I show in block form a preferred embodiment of my invention with a capability of serving 128 lines over 32 duplex channels in which two unidirectional speech and signalling leads are employed to connect each line unit to the system. Since there are more lines than channels, a concentrator or time division switching stage is employed. In this stage, a memory is provided with a permanent memory position for each channel in which addresses of assigned lines are stored. The circuits shown are primarily concerned with signalling and path control since the system includes for each line, a modem in each line circuit for modulating audio signals to digital signals for transmission and for demodulating audio signals. No showing is made herein of the modem, this device having been shown in the companion application noted previously.

The system disclosed includes one central office (CO) terminal 10 (FIG. 1A) and a plurality of remote terminals, two such terminals — 12A and 12B — (FIG. 1B) shown. As many as eight remote terminals may be employed in a full system with the number of remote terminals and line units per terminal being limited by the maximum capacity of 128 lines. With two remote terminals, as shown herein, each may have any quantity of lines so that the total between both terminals does not exceed 128.

Within the CO terminal 10, the inputs to the line units shown, such as 20, 22, 24 and 26 shown are connected to leads coupled to the final switching stage of the CO network on a line-to-line basis. The line unit outputs are commoned to respective shelf scanners such as 30 and 31, each having access to a plurality of line units to provide partial address decoding between the respective line units and the time division stage. The time division stage within the CO includes a time division interface circuit 32, a time division memory 34, and a time division control 36. The interface unit 32 provides a further stage of address decoding in directing line unit selection data to the proper shelf scanner unit for one direction of information travel and from the scanner unit for the reverse direction of information travel.

The TDS control unit provides the time division decision-making logic for switching and for recording the line status and channel assignment and status in the TDS memory. The control also acts to distribute the assignment of channels evenly to the 32 channels of the system by rotation. Within the TDS memory, each channel is accorded a permanent position to provide coordination between the channel and the lines which may be assigned to that channel. Information on the assignments is forwarded from the memory and the control to the remote terminal for coordination at the remote terminal involved.

In addition, the CO terminal provides timing control for both the transmit and receive through its transmit timing control 40 which is the master timer of the system. Timing signals are initiated in the transmit timing circuit 40, sent to the remote timing circuit 62 and returned to the receive timing circuit 42 for comparison and for alarm control through alarm circuitry 44. These timing control circuits also provide alternate mark inversion (AMI) and zeros pulse stuffing for bipolar pulse transmission. Such features are known in the art; for example, see IEEE Transactions on Communications Technology, Vol. Com 17, No. 2, April, 1969, Pages 303-310 by V. I. Johannes et al entitled "Bipolar Pulse Transmission with Zero Extraction" and U.S. Pat. No. 3,569,631 issued Mar. 9, 1971 to V. I. Johannes for PCM network synchronization.

Control and digital data are sent from the transmit timing control 40 through a conventional span line switch (not shown) and over the span, which as mentioned, may be a T1 line or the like, to a span line switch at a remote unit. Within the remote terminal, received information is channelled through the remote terminal timing circuit 62. The remote terminal timing circuit 62 (a slave of the CO transmit timing) forwards received data to the remote TDS circuit 64 for directing shelf unit selection to the shelf scanners 66 which perform a further decoding of information to selected a desired line unit 70. The timing circuit sends control information to framing circuit 72 to provide a pattern match of timing and synchronization control signals to actuate alarm circuit 74 when indicated and to do same with remote TDS circuit 64.

The system as shown herein uses 35 channels per frame, the first three channels A, B and C being used for control and synchronization purposes. The final thirty-two channels are used to carry message information and messages between a CO line unit at a central office and a remote line unit separated from the CO by a distance with a span line between the CO and each remote unit. Within this framework, the system provides facilities for time division multiplexing the 32 channels and time sharing of those 32 channels by up to 128 lines. The system is compatible with T1-type span lines and may use T1-type repeaters, as are well-known in the art.

Figure 2A:
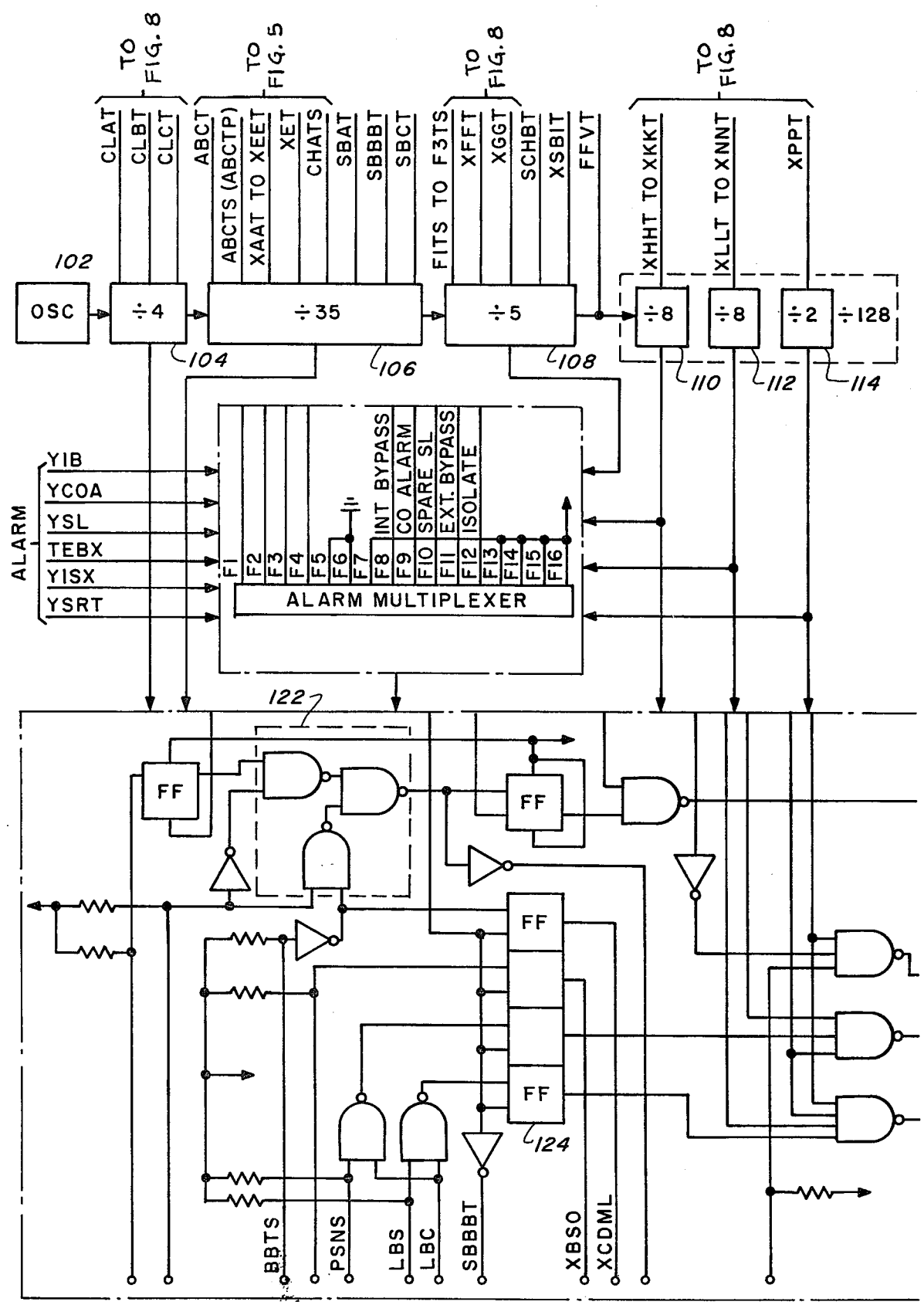
FIG. 2 is a chart showing the placement of the schematic circuit diagrams (FIGS. 2A and 2B) shown partially in block form, comprise a CO terminal transmit timing circuit as shown in FIG. 1.

The basic core of the timing control of the system is the transmit timing unit 40 of FIG. 1A, shown in block form in FIGS. 2A and 2B. This unit generates all the timing pulses for the transmit circuitry. In addition, the transmit timing unit 40 provides facilities to ensure that data for each channel is transmitted during the appropriate time period, stuff pulses to ensure proper operation of the span line, is active to convert data from unipolar to bipolar or AMI for transmission and synchronization, provides amplification and line balancing.

Within FIGS. 1A and 1B, the transmit timing circuit 40, the CO receive timing circuit 42, the remote timing unit 62, and the remote framing unit 72 combine to produce the interchange of timing, framing and control information for the system.

The time division switching and information path control are produced by the interaction of the CO time division circuits such as the interface circuit 32, the control circuit 36 and memory circuit 34 and the remote TDS circuit 64 operating in conjunction with the CO and remote terminal shelf scanners such as 30 and 66 and line units such as 24 and 70.

TIMING AND SYNCHRONIZATION IN THE C.O.

Basic timing within the transmit timing unit is derived from a crystal controlled 6.176 MHz oscillator 102 seen in FIG. 2A. This basic frequency is sub-divided in steps by respective frequency dividers of a suitable conventional type to provide all the transmit timing pulse waveforms used in the CO. The pulse waveforms produced by the transmit timing provide the channel address code. When given weights of $2^0$, $2^1$, $2^2$, $2^4$ and $2^5$ respectively (the first three time periods being reserved for control channels A, B and C), a truth table can readily be constructed to show the channel address from 1 through 32 (0 through 31).

Similarly, further pulse waveforms generated from the basic timing frequency provide the line unit addresses (1 through 128).

The remaining pulse waveforms are used to provide synchronization, framing standards and other timing requirements.

The pulse frequencies from the CO transmit timing unit are sent to the various other transmit, receive and/or common cntrol units within the CO terminal to control the basic transmission functions.

Serially, the dividers of the transmit timing unit include a divide-by-four counter 104 to break each channel into four sections. A divide-by-35 counter 106 provides the channel address signals (three control plus 32 data), its cycle comprising a frame. A divide-by-five counter 108 produces one superframe for frame synchronization purposes. A divide-by-eight counter 110 produces a subgroup (40 frames) for the completion of a channel A control cycle. The next divide-by-eight counter 112 produces one group for Channel C control (320 frames) with the final counter divide-by-two counter 114 producing a channel B control cycle of 2 group duration (640 frames). Note that the final four dividers produce a division of 5 × 128. From this is derived the 128 which is used to provide the line address signals.

Signalling and control information is passed from end-to-end over channels A, B and C, the first three channels in each frame, as mentioned, these channels being used for timing, framing and synchronization.

As each frame is scanned within the memory 34, the information stored in the control channel periods is released to the appropriate circuit causing the desired action, when received, at the distant end. As mentioned, channel A requires forty frames (one subgroup) to complete a cycle. Channel B requires 640 frames (one super-group) to complete a cycle. Channel C requires one sub-group for each 16 channels, thus taking eight sub-groups (one group period) to complete a full cycle.

Frame synchronization which is performed by controlled bipolar violations (BPV) occurs every fifth frame. During the fifth frame, timing control channels transmit a "101" pattern modified to provide a bipolar violation. The second 1 of the pattern contains a bipolar violation (BPV), which is used at the receive end for synchronization purposes. This BPV is added to the baseband control signal from channel organizer 120, zero counter and pulse stuffer 128 to AMI generator 132 of transmit timing unit 40 to the span line. The BPV is generated in the AMI generator circuit 132 of the CO transmit timing unit. Since the BPV is controlled by the transmit clock which controls all transmit timing and the BPV, in turn, controls the remote receive synchronization, both ends of the circuit maintaining the same time standard through this syncrhonization. The zero counter circuit also acts to shift the output by four channel periods relative to its input to provide a delay to allow for pulse stuffing which restricts the maximum number of consecutive "zeros" which may be delivered to the span line. It is a well known phenomena of span lines of T1 type design that satisfactory operation depends on the transmission of signals having a high density of "ones". Performance of such span lines becomes unacceptable when signals capable of consisting of many consecutive zeros are passed.

COMMUNICATION PATH CONTROL IN THE C.O.

Voice signals from a subscriber station, enter CO terminal 10 via the Co line unit 24, pass through a hybrid to become the transmit portion of a two-wire signal. At this point, the signal is still in analog form. The analog signal is converted to digital form by a continuously variable slope delta modulator (CVSD) unit within the line unit. The output of the CVSD is a series of logic 1 and/or 0 level.

The shelf scanner 30 is used to receive line unit addresses from the transmit timing unit 40 via the interface unit 32 to decode the addresses and send a signal to the appropriate line unit enabling the output gates. Thus the line units are scanned peridically and are enabled when a condition is found indicating that the line unit is seeking service. This line unit enabling permits the transmission path to be carried through to the inhibit circuitry of the shelf scanner unit as will be described later herein. The transmission path at this point is called the "baseband".

The shelf scanner will inhibit baseband transmission if: (a) A shelf alarm exists, or (b) A fuse alarm exists through means not shown herein. If neither of these conditions exist, the baseband will be gated through to the transmit timing unit on lead BBT (Baseband Transmit).

Baseband signals enter the transmit timing unit via the channel organizer circuit 120 from the shelf scanner on lead BBTS to the input gating 122. This data is framed in the five position latch register 124 and passed to output gating 126. Each signal will be allowed to pass (assuming it is not channel A, B or C time period) to the consecutive zeros counter unit 128 which inserts a 1 if more than four consecutive zeros are passed as indicated by shift register 130 within unit 128. This "pulse stuffing" is used to keep the span line repeaters active during idle traffic periods as is known. This pulse stuffing uses known techniques and uses an existing pulse coding procedure.

Next, the baseband signal enters the AMI generator 132 which inverts every second mark through flip-flop 134, thus conserving band width and centering the transmit power around 772 KHz. The AMI signal enters a line driver 136 for amplification and passage to a line balancing and isolating transformer (not shown). From this point, the baseband signal in AMI form is passed to the span line equipment via the span line transmit (SLT) output.

RECEIVE TIMING IN THE C.O.

Figures 3, 3B:
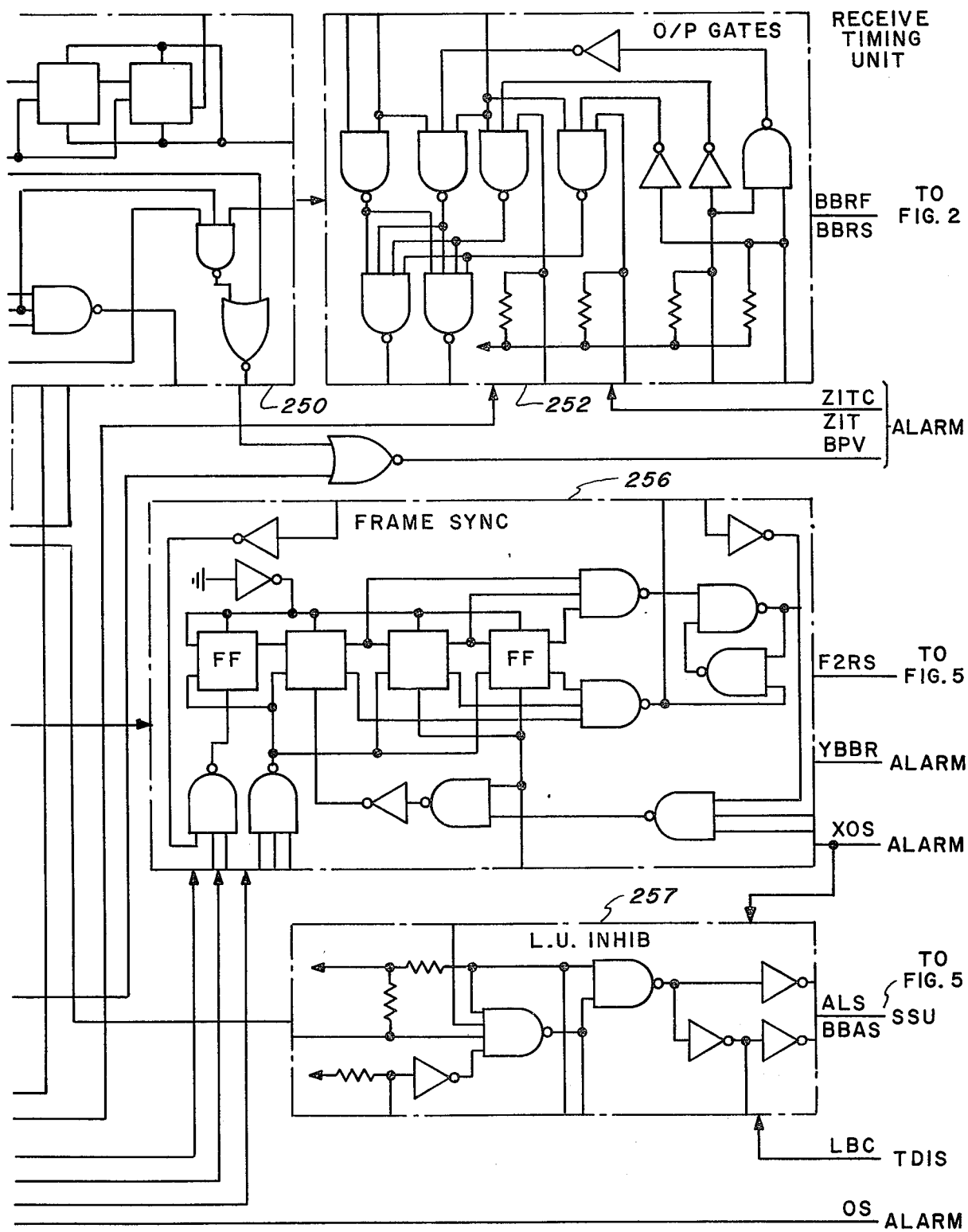
FIG. 3 is a chart showing the placement of the schematic circuit diagrams of FIGS. 3A and 3B partially in block form comprise a CO terminal receive timing unit as shown in FIG. 1.

Timing for the CO receive circuit 42 (FIGS. 3A and 3B) is very similar to that generated by the CO transmit unit. In this unit, received timing signals are fed for comparison with the oscillator allowed signals for control purposes such as synchronization and alarms. Most of the same frequency waveforms are generated and are used for generally the same purpose in the receive function. The only real difference (aside from some missing waveforms) lies in the creation of two new waveforms used during the signalling cycle in channel C to provide status reporting. Thus the divider circuits fed from an oscillator 212 include a divide-by-4 counter 214, a divide-by 35 counter 216, a divide-by-five counter 218, two divide-by-eight counters 220 and 222. The final counter is a divide-by-two counter 224.

During the ABC channel periods of frame 5, the 101 pattern (with the second 1 violated for synchronization purposes), generated by the transmit circuit at the remote end, is received by the receive timing circuit. The bipolar violation (BPV) is detected in the BPV detector and passed to the error control shift register which then synchronizes the divide-by-35 and divide-by-5 counters with the incoming BPV. The shift of four channel periods is also produced.

Additional synchronization is provided by the AFC circuit 226 which phase-locks the 6.176 MHz oscillator as a function of the incoming baseband signal.

Baseband signals are received in the CO terminal from the span line equipment on lead SLR and enter via the line receiver 240 of the receive timing unit. This unit includes a line balancing transformer and passes received data to a BPV detector 242 which includes a flip-flop 243 for detecting the violations. The line receiver 240 converts the incoming signals to normal binary form. Detector outputs are applied to a baseband detector 244 which comprises an eleven-stage flip-flop network. The line receiver 240 also passes signals to an AFC circuit 226 and a baseband alarm circuit 248.

As mentioned previously, since the receive timing is synchronized from the transmit timing, the address decoding at the receive end is the same as the encoding process at the transmit end. Addresses are generated in a set pattern and, due to synchronization, will appear in the appropriate time period. A received baseband signal is gated to the interface unit 32 to determine the actual line unit and shelf address to which the signal should be passed. The signals are decoded for the proper shelf and fed to the shelf scanner 31 and line unit 2 such as unit 24.

Figure 4:
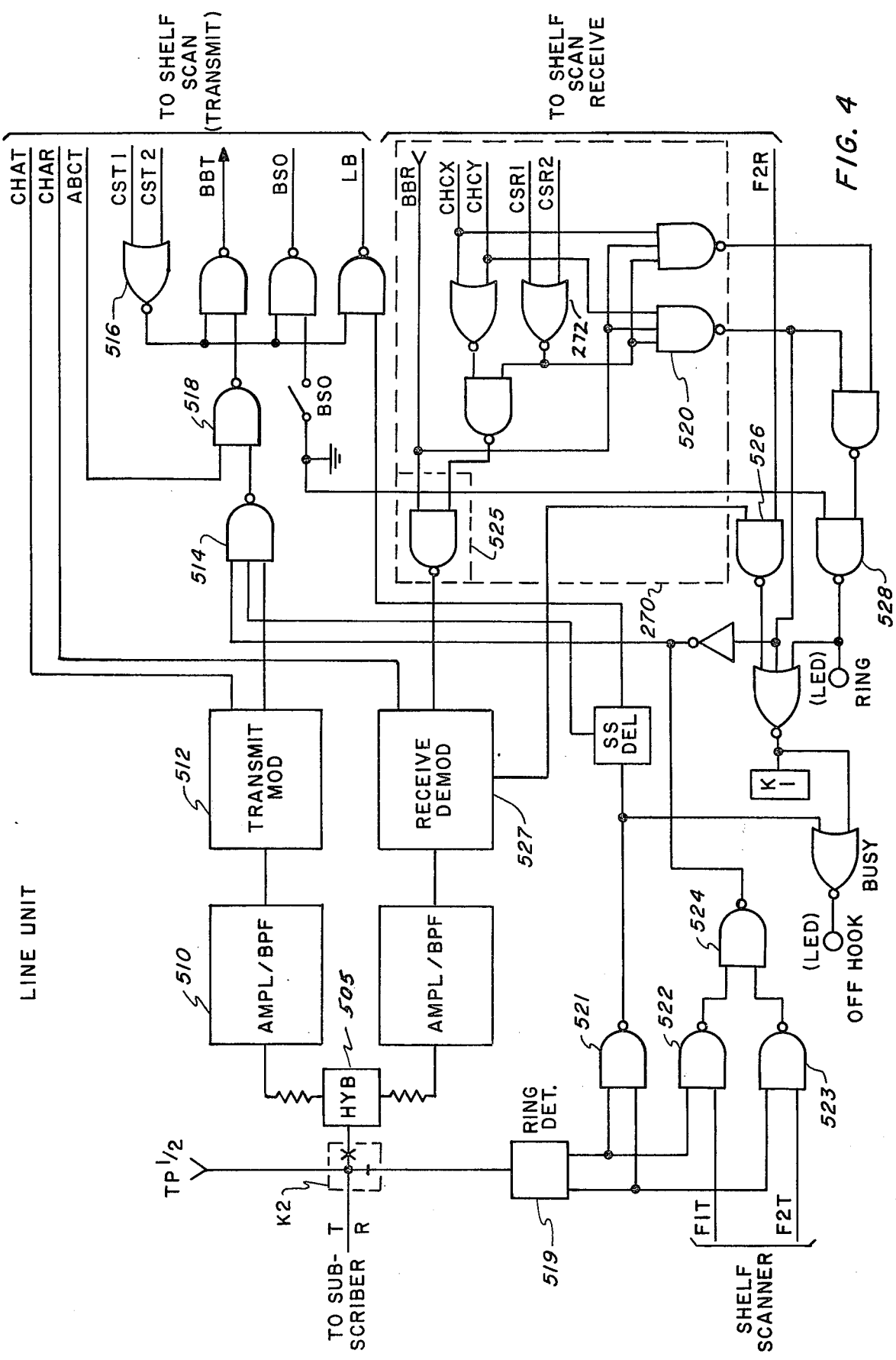
FIG. 4 is a circuit diagram of a line unit capable of bridged ringing.

Having arrived at the receive input of the line unit of FIG. 4, the baseband signal is applied to the line unit input gating circuit 270. During the appropriate time period, the input gates 272 are enabled and the information contained in the baseband signal at that particular 648 nanosecond period, enters the unit on lead BBR (Base Band Receive) and is stored for application to the receive demodulators.

Demodulation of the receive baseband signal is identical to the process previously described for modulation of the analog signal.

SHELF SCANNER

Figure 5:
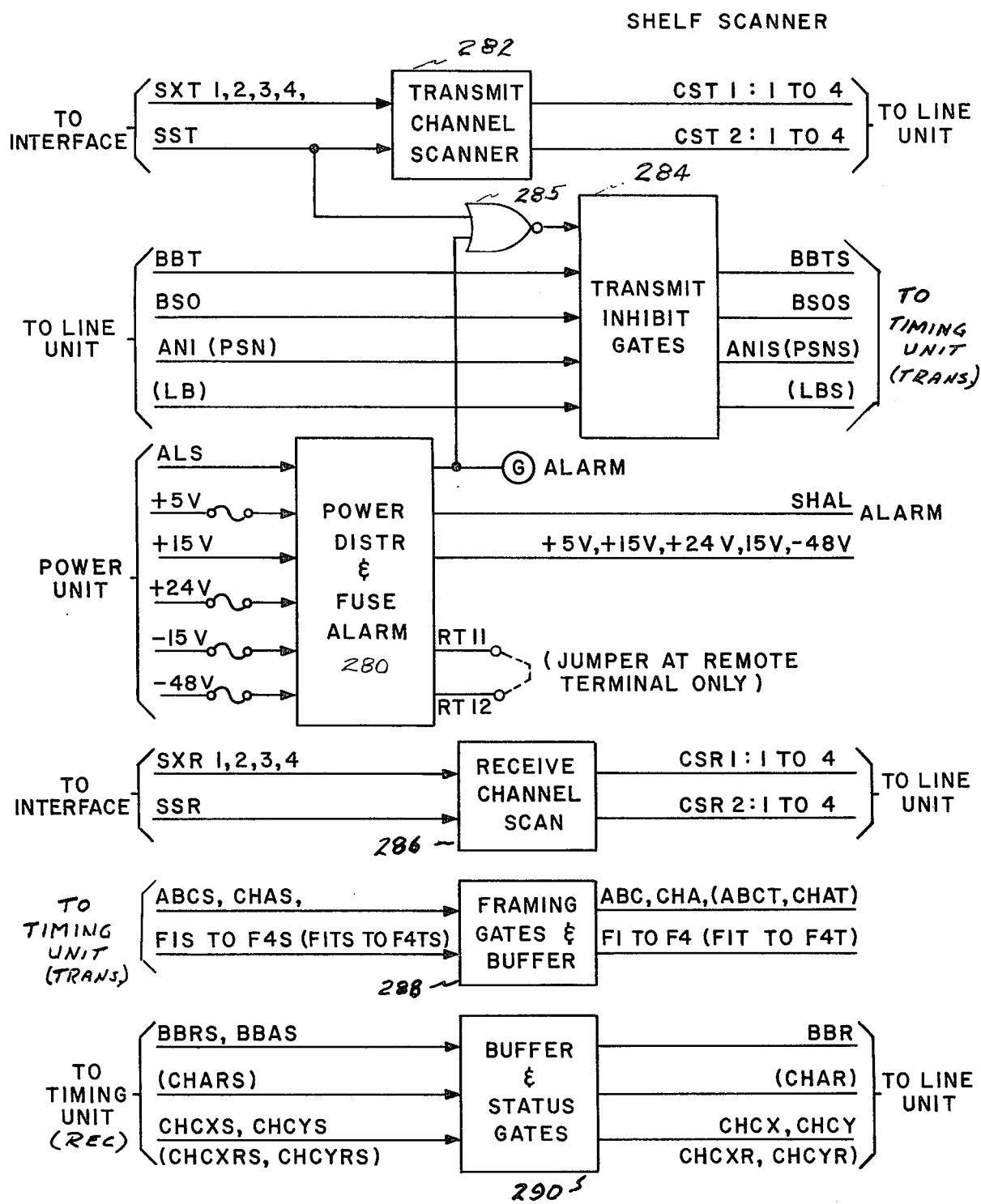
FIG. 5 is a schematic diagram in partial block form of a typical shelf scan unit of FIG. 1.

In FIG. 5, I show in block form a shelf scanner 30 which is usable with only minor variation in either the CO terminal or the remote terminal. One such shelf scanner is provided for each sixteen line units to provide address decoding circuitry to direct line scan information between the system and the appropriate line unit within the line unit shelf. Additional circuitry 280 within each shelf scanner provides power distribution and alarm facilities for the terminal.

Within the shelf scanner, the transmit channel scanner circuit 282 comprised of an integrated circuit decoder directs channel address codes from the TDS multiplex equipment and TDS interface 32 to enable the appropriate line unit in the shelf when desired for transmit. Shelf wiring is such that a given line unit, of the maximum sixteen per shelf, is enabled at a given time in accord with the code on leads CST1 and CST2 to the line units.

The transmit inhibit gates 284 prevent transmission of the input signals when the shelf is in an alarm condition or during periods when the shelf is not selected. These gates may be three-state devices (not shown) enabled from the power distribution system through NOR gate 285. Transmit baseband signals from the line units enter the shelf scanner via the BBT lead. These signals pass through the transmit inhibit gates if the transmit select (SST) lead signal is present and the shelf is not in an alarm condition.

The receive channel scan circuit 286 (similar to the decoder of scanner 282 directs the channel scan information to the appropriate line unit within the shelf for the receive direction.

The framing gate and buffer circuits 288 comprised of inverter gates pass the basic timing information to the line units. The buffer and status gates 290 also act to pass receive baseband information from the multiplex equipment to the line units.

The shelf scanner unit also acts as the power distribution and alarm point for the line units. An incoming alarm on the ALS lead through a NOR gate (not shown) or on gate 285 prevents all line units from transmitting or receiving baseband signals by cutting off their power sources.

TIMING CONTROL WITHIN A REMOTE TERMINAL

Within the remote terminal 12, the remote timing unit 62 (FIG. 6) contains oscillator and dividing circuitry similar to the CO transmit and receiving timing units.

The major difference between remote and CO timing is that the remote oscillator 302 is controlled, via an AFC circuit 303 by the received signal. Additionally, the remote timing unit only has three dividers: a divide-by-four (304), a divide-by-thirty-five (306) and a divide-by-five (308), thus omitting the line unit and control dividers. The functioning of the remote terminal is generally similar to the receive timing unit at the CO; however at the remote end, the timing control is applied to provide both the receive and the transmit timing. Where the CO has two 6.176 MHz oscillators operating independently for transmit and receive, the remote terminal has only one, phase-locked to the incoming signal.

Figure 6:
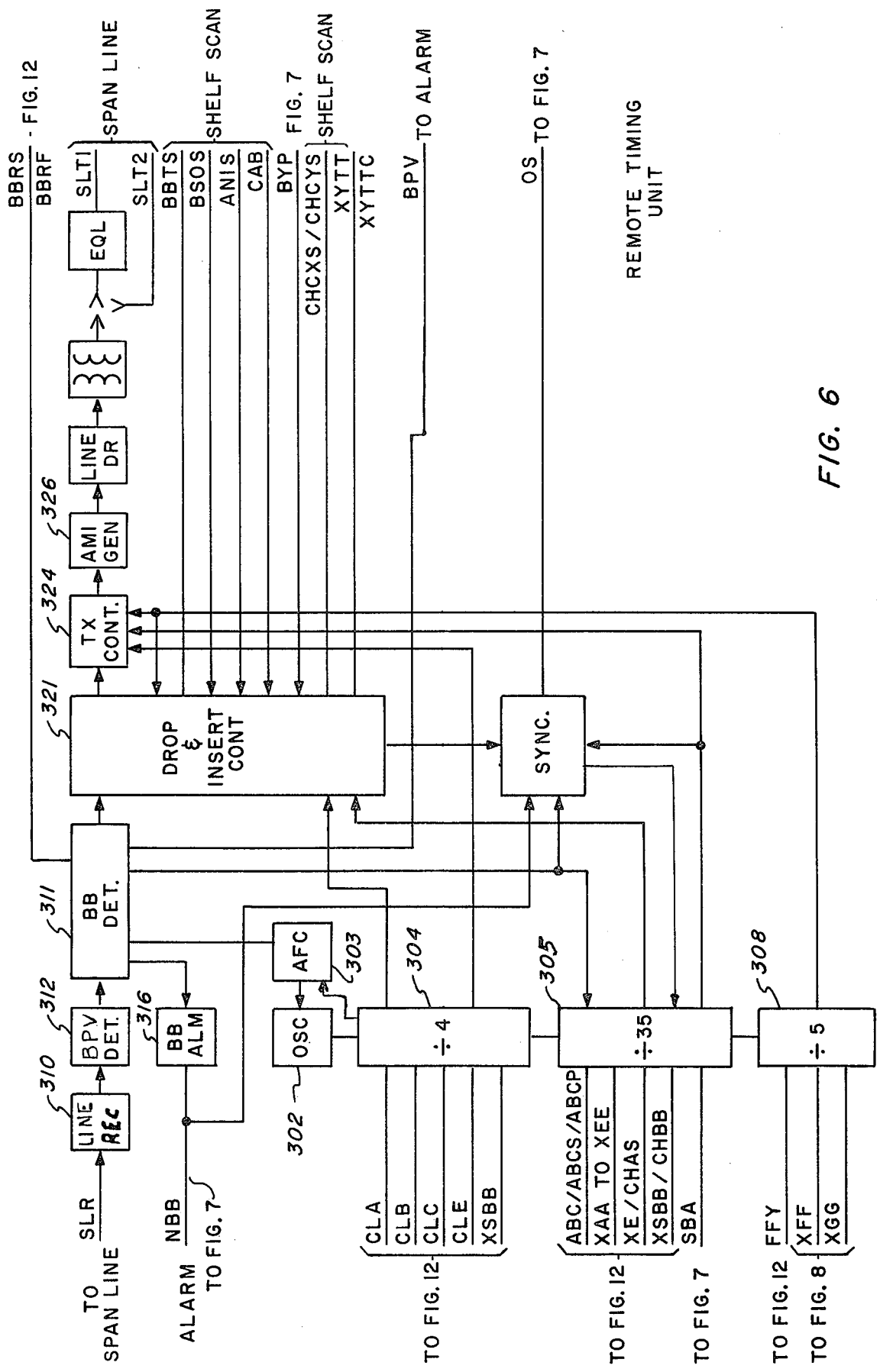
FIG. 6 is a block diagram of a remote terminal timing unit of FIG. 1.

Within each remote terminal, additional gating circuitry (not provided at the CO) is used for drop and insert control circuit 321. As mentioned, a remote timing unit 62 as shown in block form in FIG. 6, is quite similar to the transmit timing circuit. The remote timing unit provides the basic timing waveforms for both the transmit and receive portions of a remote terminal. In addition, the remote timing unit acts as a carrier signal detector, bi-polar violation detector, error detector, synchronizer and regenerative repeater. It also provides drop and insert capabilities for local lines.

The basic timing is derived from a 6.176 MHz crystal controlled oscillator 302, which is phase-locked on the received signal through the AFC circuit 303. The oscillator drives all other timing circuits in the timing unit. The basic signal is divided by four, then thirty-five, then five.

Received baseband signals enter the remote timing unit via the SLR leads from the span where they are passed through a line receiver 310 and a BPV detector circuit 312. The line receiver 310 is similar to the one described and shown in the receive timing unit 42 and acts to change the signal from AMI to digital form for application to the baseband detector 314 via BPV detector 312.

The line receiver also passes the signal to a baseband alarm circuit 316 and an AFC circuit 303.

The baseband alarm circuit provides an alarm output if the baseband signal fails.

The automatic frequency control circuit (AFC) 303 provides a frequency control signal to the 6.176 MHz crystal oscillator. The AFC signal is based on the received signal thus providing basic synchronization with the clock in the CO terminal.

Included in the baseband detector is a zeros counting function. The baseband detector is similar to circuit 244 of the CO receive timing unit. This circuit is made up of two basic stages. One processes all received baseband signals and the other is concerned only with bipolar violations (BPV's) and stuffed 1 detection. The prime function of circuit 311 is to reconstruct the received baseband signal, making it an exact duplicate of the transmitted baseband signal. This requires removal of intentional BPV's (other than those in frame five) and stuffed 1 signals.

The received baseband signal is checked in the same manner described for the receive timing circuit 42.

Having detected the presence of a violation, circuit 311 compares this bit with the violation in the same bit (after it passes through a shift register) in the baseband path. The two bits will be of opposite polarity so a 0 will be passed on, restoring that bit to its original state. Stuffed ones will be removed in a similar manner.

The restored baseband signal is then passed on to the line units over the BBRS lead by way of the appropriate shelf scanner unit.

Coded baseband signals to be transmitted to the CO enter the remote timing unit via the BBTS lead and the drop and insert control circuit 321 from which they are applied to the transmit zeros counter circuit 324.

The transmit control circuit works in conjunction with the AMI generator 326 to produce bipolar output signals whose makeup can be predicted regardless of the input condition. This facilitates error detection at the receiving end. Bipolar violations and stuffed ones are generated by the transmit zeros counter circuits 324 and AMI generator 326 in accordance with the rules previously set forth for the transmission and receiving.

The drop and insert circuit 321 as used in the baseband receive path includes a logic gating network to gate all information contained in the baseband signal to the BBRF and BBRS leads. Bipolar violations are routed to the BPV lead, all other baseband data is passed on via the BBRS and BBRF leads. The information content on both these leads is identical.

The transmit portion of the drop and insert circuit controls transmission of the local transmit baseband data, ensuring transmission during the correct time periods, inserts the BSOS (busy) and ANIS (automatic number identification) bits and permits by-passing the channels which are not dropped. The output of the drop and insert control circuit is passed on to the transmit control circuit as previously discussed.

Both the transmit and receive baseband signals are synchronized to the incoming baseband signal. Basic synchronization is derived through the AFC circuit which controls the 6.176 MHz oscillator. The oscillator, in turn, drives all other timing circuitry at a remote terminal.

An out of sync alarm occurs if four consecutive frame five (FFV) synchronizing (bipolar violation) pulses have been missed. The alarm is passed to the alarm unit via the OS lead.

Figure 7:
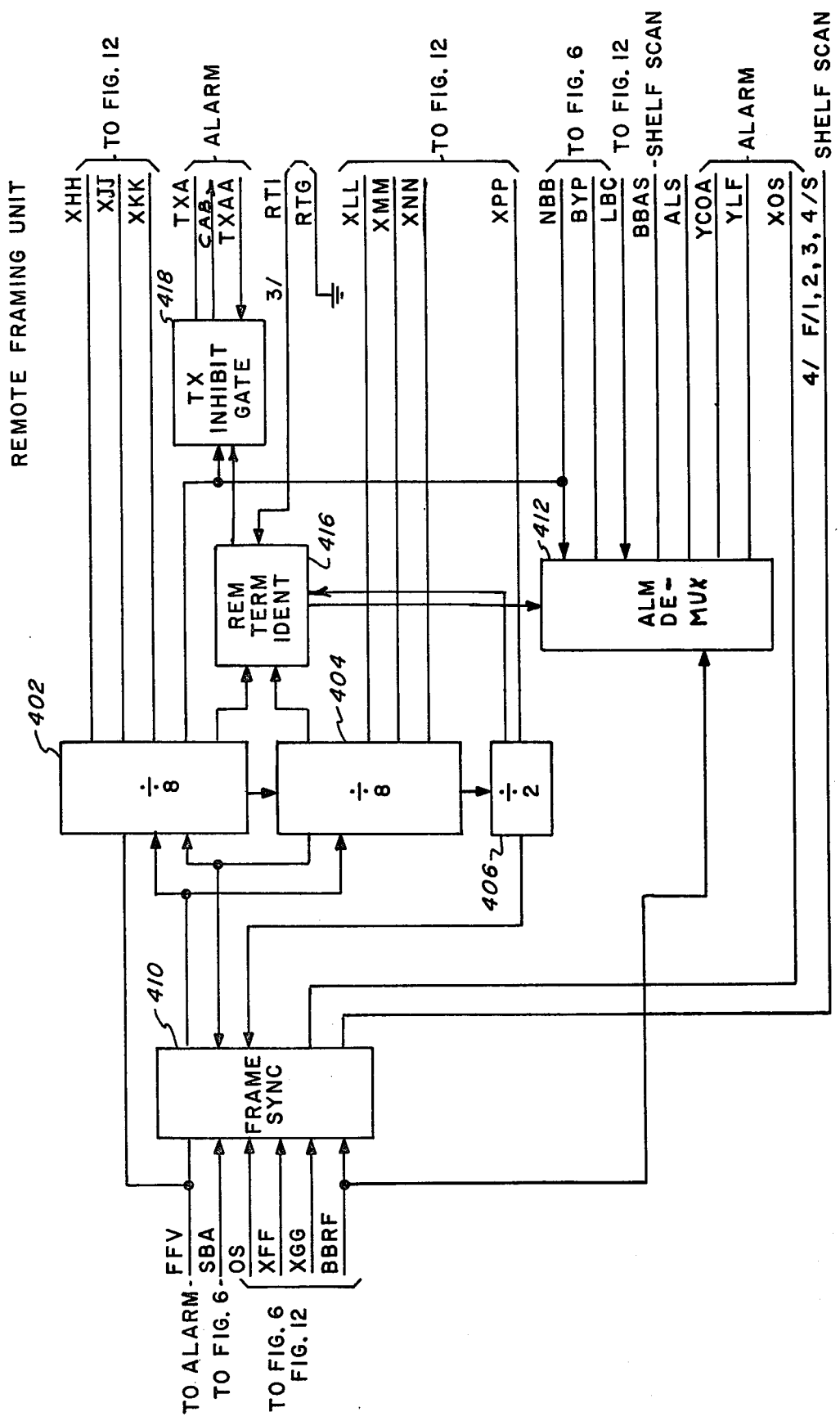
FIG. 7 is a block diagram of a remote terminal framing unit of FIG. 1.

The remote framing unit shown in block form in FIG. 7 is driven by the input signal on lead FFV to provide six line unit address codes (two more are provided by the remote timing unit) via a divide-by-128 circuit. The divide-by-128 circuit is composed of two divide-by-eight counters 402 and 404 and one divide-by-two circuit 406.

Line unit address codes are derived from the divide-by-128 circuit (in conjunction with two other codes from the remote timing unit). These codes are designated XFF and XGG (on the remote timing unit) and XHH through XMM. Using the outputs on these leads plus XFF and XGG on the remote timing unit, a truth table can be built to show line unit address codes from 1 through 128 (0 through 127).

Frame synchronization through circuit 410 (similar to synch circuit 256) is based on the detection of a repetitive pattern located in the A channel time period in every frame except frame five. The pattern consists of a seven bit code and occurs during the beginning of each 40 frame signalling subgroup. The code consists of a four bit sub-group identification and a three bit fixed pattern to hasten the acquisition of the code and synchronization to same when an out of synchronization condition exists in the system. The cyclic rate of the pattern is 640 frames (one supergroup). Using this type of pattern, resynchronization time for the system is four subgroups after the successful detection of the beginning of a supergroup. If the subgroup identification pattern does not occur during four consecutive subgroups, an out of sync condition is generated and passed on to the remote alarm unit via lead XOS.

Alarm and control information from the CO terminal is applied, via the BBRF lead, to the alarm demultiplexer circuit 412 where it is processed during channel A time period of all frames except frame five. The CO alarm is the only alarm transmitted by the CO terminal.

Commands from the CO terminal can cause the spare span line to be switched in (YSS), place the remote terminal in the external bypass (YEB) or isolate (YIS) mode of operation.

The remote framing unit processes the following local alarms: (1) Internal bypass (YIBL), (2) Bypass (BYP), (3) No baseband (NBB), (4) Baseband alarm (BBAS), and (5) Line unit (ALS).

These alarms originate in other parts of the system remote terminal. The remote framing unit merely detects and processes them in circuit 412 before passing them to the remote alarm unit.

Three leads, designated RTIA, RTIB and RTIC determine the remote terminal identity when strapped to ground. Properly strapped, these leads within circuit 416 comprising multiple exclusive OR gates feeding OR gates for each input lead of the three noted act to identify which remote terminal of the possible eight is transmitting alarm conditions at a given time.

The transmit terminal inhibit gate 418 includes AND gates responsive to the divide counters to inhibit the transmit timing in the event of an alarm condition of major proportion.

LINE UNIT

As can be seen in the block diagram of FIGS. 1A and 1B, there are provided line units at each end of the system, at the CO end line unit 20 interposed between CO switching equipment on the CO line leads and a shelf scanner 30. In the remote terminal, line unit 70 is interposed between the shelf scanners 66 and the conductor wires to the subscriber stations. The line units at each end are very similar. These line units may be of one type equipped for coded divided ringing or of another type for bridged ringing, a typical CO unit of divided ringing type being shown in FIG. 4.

Analog signals enter the unit via the tip and ring leads T and R and are applied to the hybrid circuit 505. The transmit output of the hybrid passes the signal to the input of an amplifier and bandpass filter circuit 510. The amplifier is normally set to provide the correct gain for a variable input level from the two wire leads from the central office. The amplifier output feeds a voice frequency level bandpass filter within block 510 whose output is connected to an input of the modulator 512. The modulator 512, which may be of the type shown in Canadian Pat. No. 935,581 issued Oct. 10, 1973 to E. Pinede et al, produces a digital output representative of the change in analog voice signals received.

Modulated digital or baseband signals for the transmit direction leaving the modulator 512 will be gated through to the output (BBT lead) through gate 514 if the following conditions are met: (a) During the time period for the line unit in question, leads CST1 and CST2 are both enabled, enabling gate 516; (b) The time period is not A, B or C as indicated by the ABCT lead and gate 518 being enabled; and (c) Signalling is not in progress as indicated by gate 520.

Ringing signals incoming from the central office equipment are prevented from passing through the hybrid circuit by the normally open contacts K2 of relay K1. These contacts divert ringing signals applied to the tip and/or ring leads to the ring detector circuit 519 which, in turn, applies the signal to the signalling gates 521–524. Signals for the ring party are sent during frame one on lead F1T and for the tip party during frame two on lead F2T. The transmission facilities of the system translate the frame one and frame two signals into the frame two and frame three periods respectively for use at the subscriber end. Ring trip occurs due to the subscriber going off-hook and causing operation of K1, thus closing the DC path through the hybrid back to the ringer equipment.

For the receive direction, when a subscriber at the remote end of the system goes off hook, relay K1 is operated by way of BBR input lead, gate 525 the receive demodulator 527 and gates 526 and 528, closing its contacts K2 to complete the central office lines. As the subscriber dials, relay K1 pulses to make and break the loop. Dial pulses are received on the BBR lead and, during the frame two periods are gated through to K1 by way of timed pulses on lead F2R and gate 526. Relay K1 pulses and operates the off-hook/dial lamp. At the completion of the dialing process, K1 remains closed.

Operation of the VF loopback switch causes the transmit and receive circuits at the remote line unit to be looped, thus permitting received signals to be re-transmitted. It also breaks the receive leg of the hybrid in the central office line unit and places a termination at the output of the receive amplifier/bandpass filter circuit. Thus operation of the loopback switch permits end-to-end testing of both the central office and remote line units plus all system facilities between the two. Test points switched into the output circuit of the amplifier/bandpass filter circuit permit measurement of the received signal to provide an indication of end-to-end system performance.

TIME DIVISION CONTROL

Figure 8A:
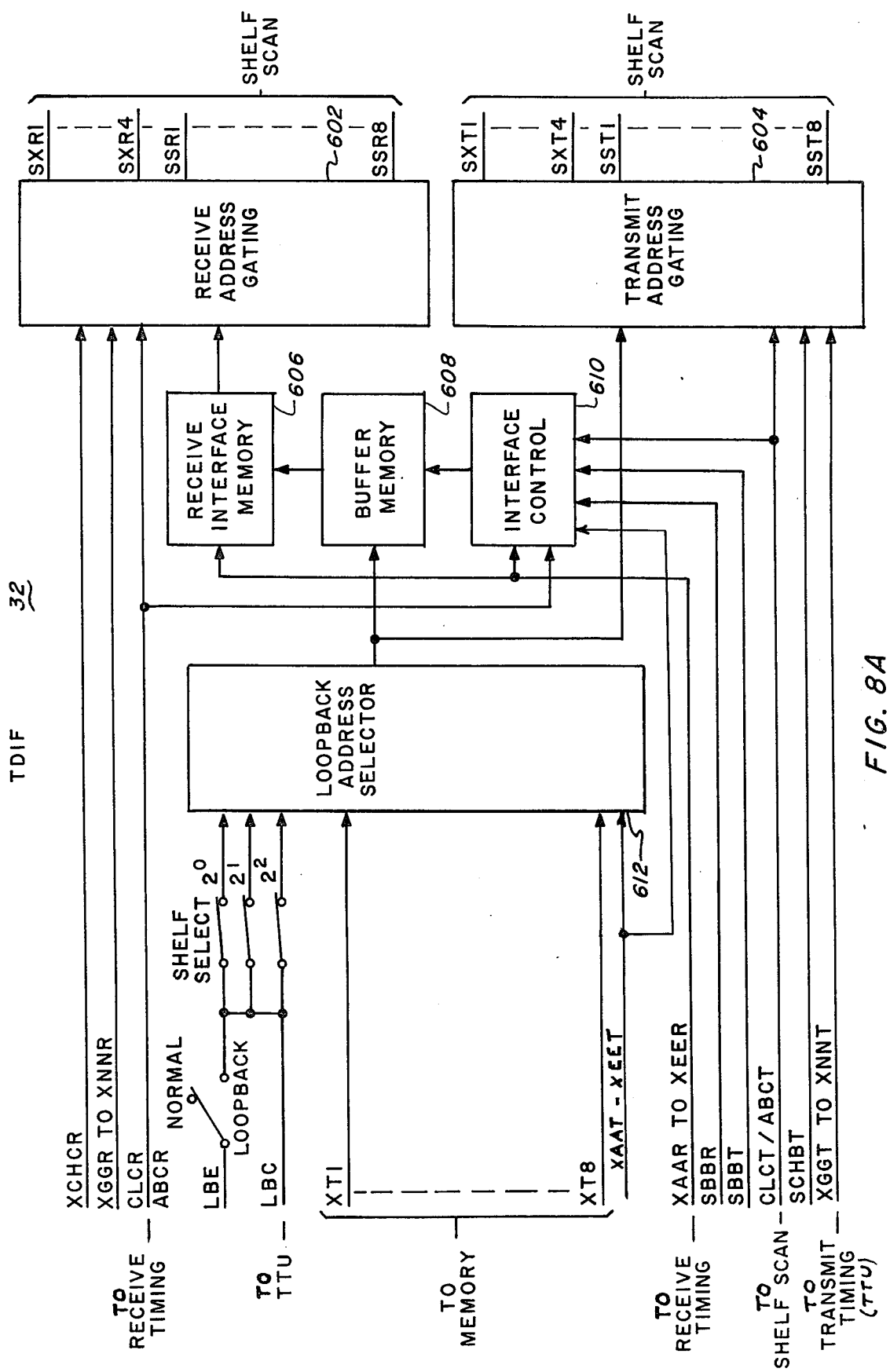
FIG. 8, including 8A and 8B, is a schematic block diagram circuit of a CO time division stage including interface unit, control unit and memory unit.

FIG. 8 is a block diagram of the circuits which make up the time division switch to enable the system to serve 128 lines. In this figure are shown the three circuits which interact to associate a line with a channel for use, to provide memory of the condition or status of each line, to provide memory indicating the condition of each channel and to provide decision-making based on the exchange of information between these memories.

Taking first the interface circuit 32 (shown in detail in FIG. 9) the circuit includes one stage of coding and decoding of line address information, with its main purpose being to insure proper association of channel timing to lines in both the receive and transmit modes. Thus, the circuit 32 provides gating indicated as block 602 for line unit addresses from the receive timing circuit 42 to control decoding to the shelf scanner 30 at the central office. A similar gating stage 604 provides gating for line unit addresses from the transmit timing 40 to the shelf scanner 30 for the transmit direction.

Each of these gating circuits 602 and 604 provides a three to eight decoding from the three received shelf address leads to eight shelf scanner selection leads, one lead per shelf scanner. The interface also contains a 32 position memory — 606 — with eight bits per position, each position for association of a line unit with a channel for receive timing. A buffer memory 608 or series of eight transfer latches provide information transfer between loop back address selector 612 and receive memory 606. The transfer or interface control 610 is comprised of comparators, gating and flip-flops.

A loop back selector gating unit 612, with eight gating sections receives line unit addresses for feeding the latches of memory 608 and transmit address gating 604 to perform loop back testings as will be explained. Switches in the loop back selector allow the selection of lines for testing of line loop back and the like.

Figure 11A:
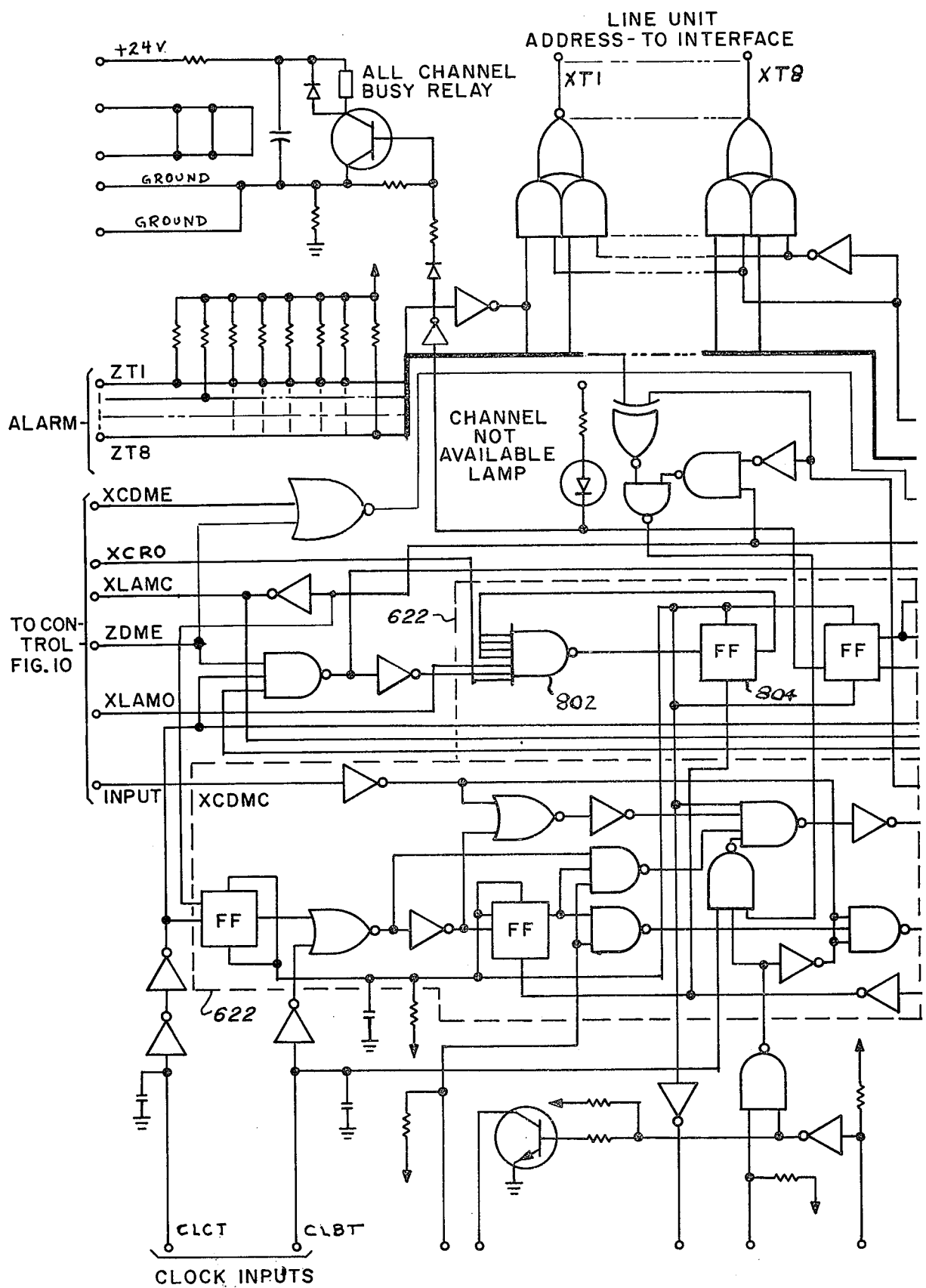
FIG. 11 is a chart showing the placement of FIGS. 11A and 11B to form a detailed circuit of the memory unit of FIGS. 1 and 8.

The memory unit 34 of FIG. 11 generally acts to assign channels to service calls and to store line unit addresses in the proper channel positions. The memory includes a 32 position memory 620 with eight bits of data per position. Channels are assigned by the assigner 622 responsive to a channel demand from the control circuit 36. The channels are scanned for information by a control circuit 628 for operating a parallel-to-serial converter in the form of a shift register 626 to provide line information to the remote terminal by way of the transmit timing. A channel scanner 624 keeps track of line addresses and insures that no line is assigned to more than one channel.

Figure 10C:
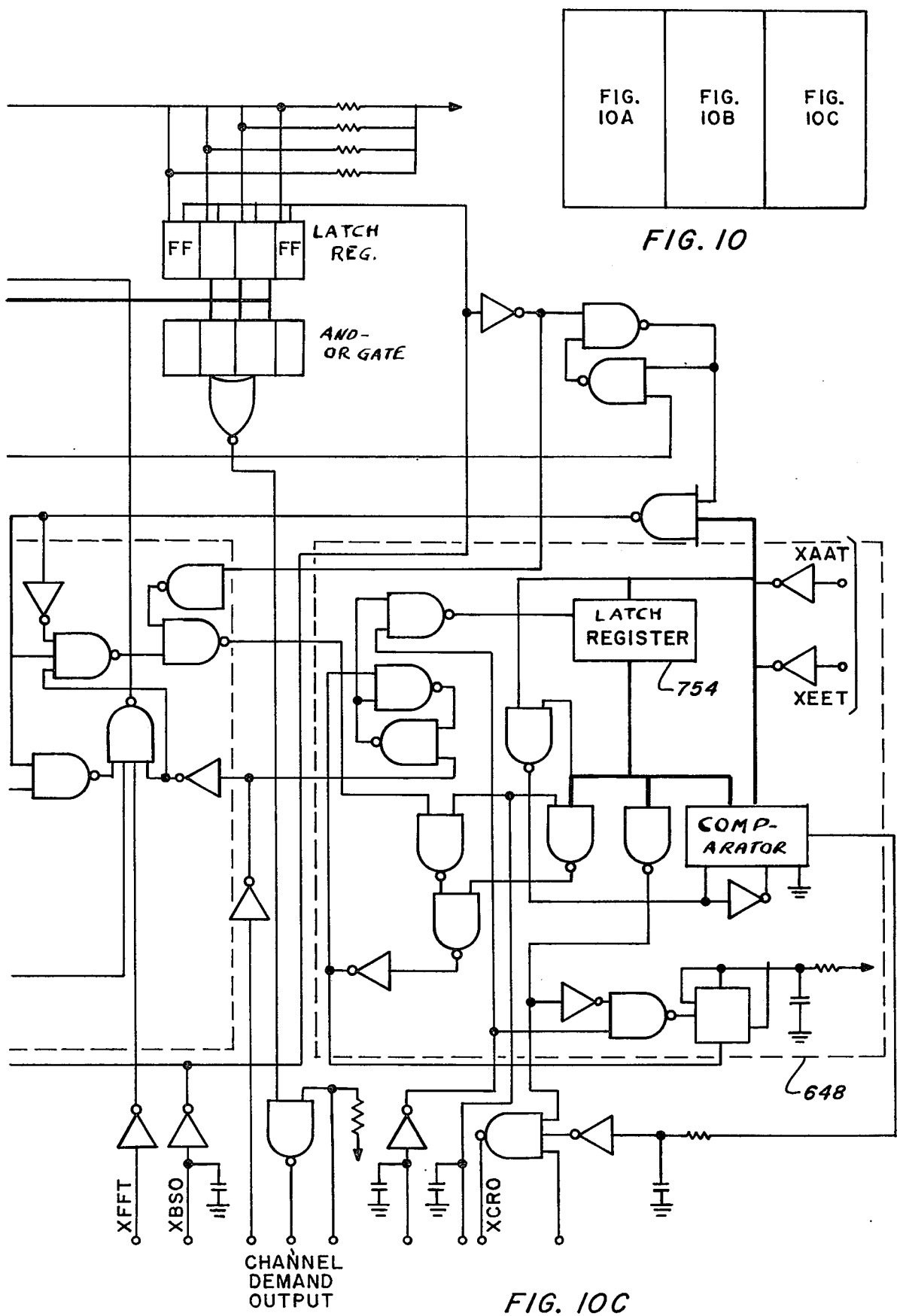
FIG. 10 is a chart showing the placement of FIGS. 10A, 10B, and 10C to form a circuit diagram in greater detail of the time division control circuit of FIGS. 1 and 8.
Figure 10A:
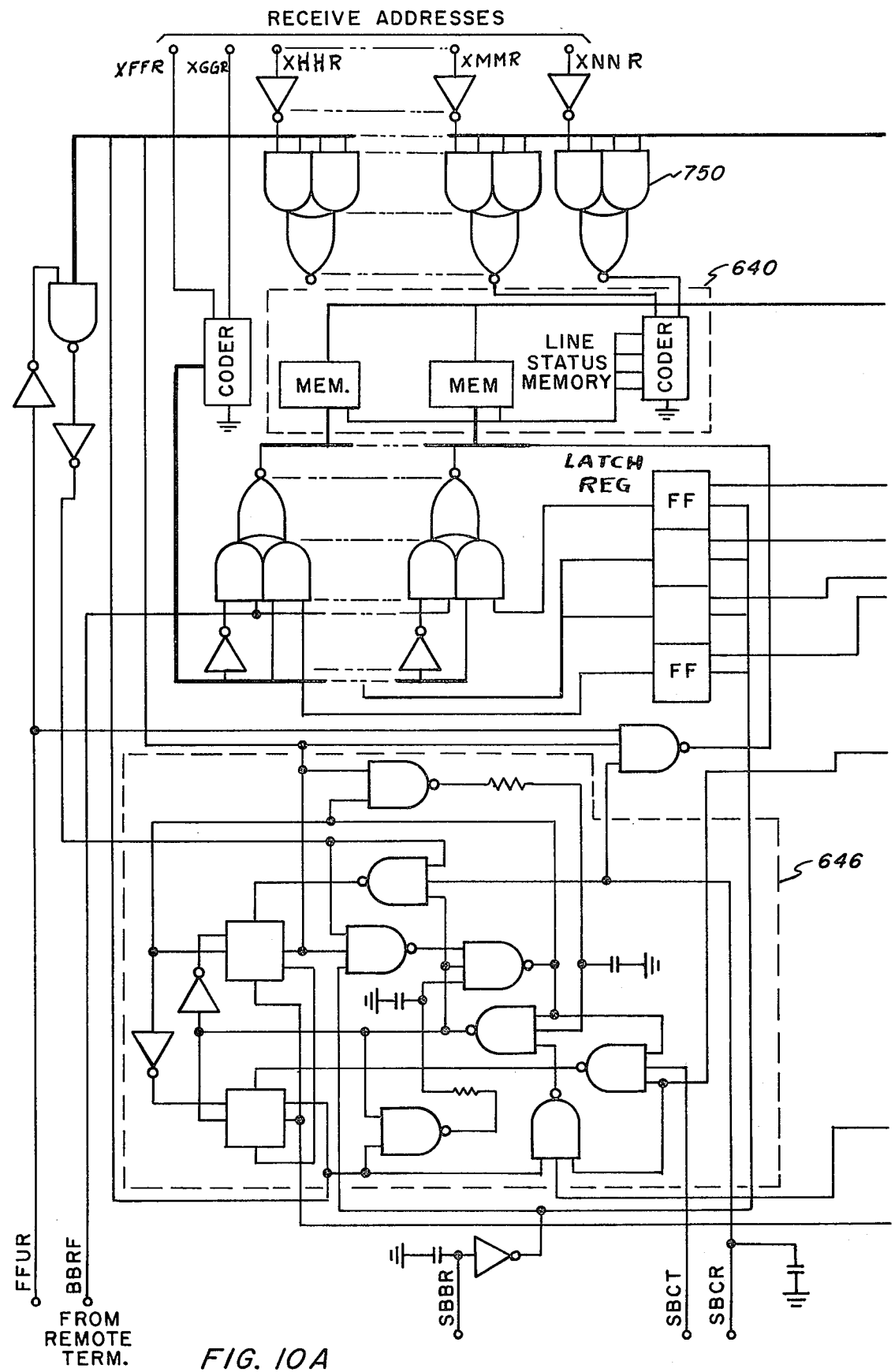
Figure 10B:
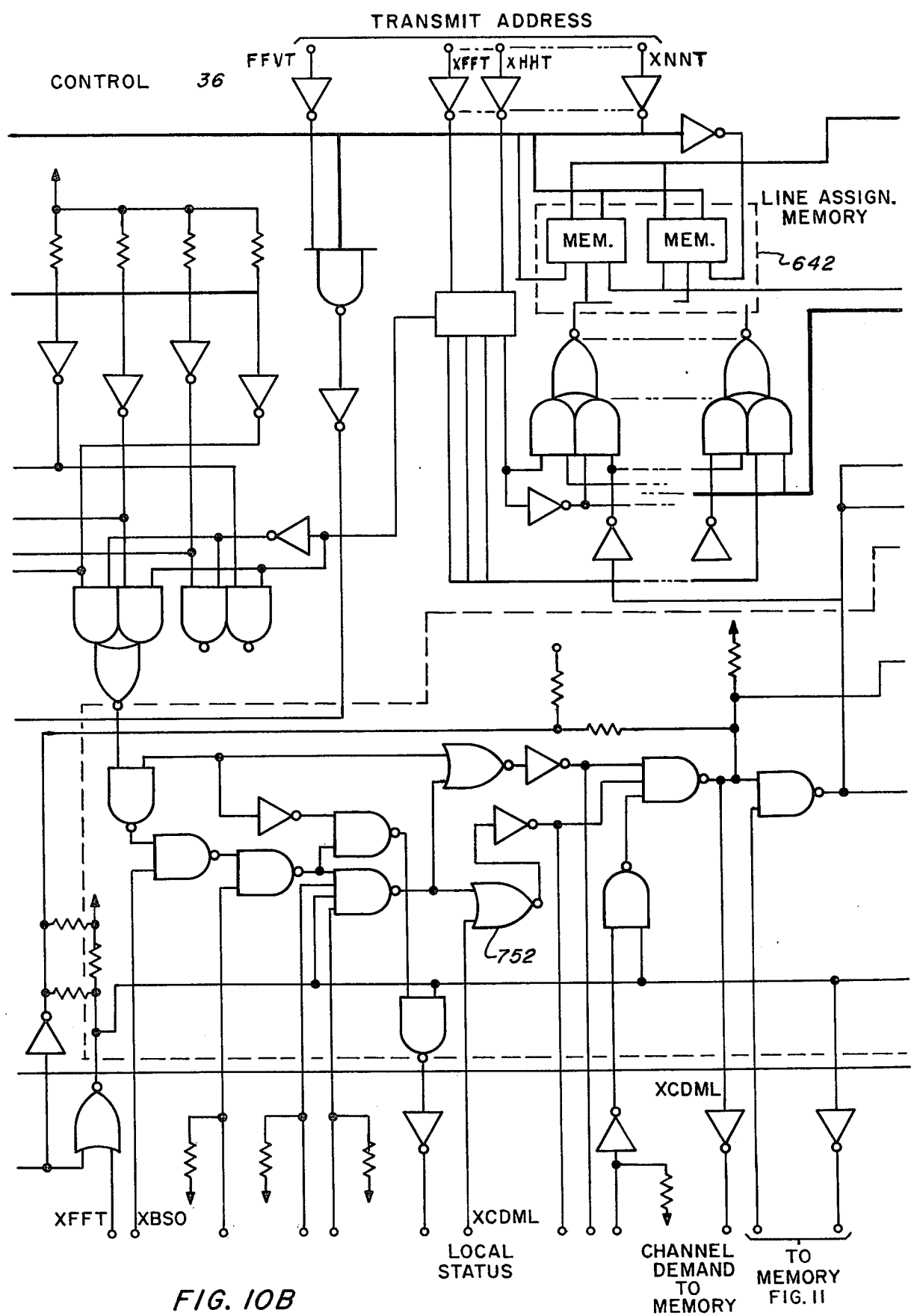

The control unit 36 of FIG. 10 includes a first and a second memory area, each with 128 positions, each corresponding to a line. The first memory 640, has two bits per line to signal three possible conditions of the line at the remote terminal line: (1) On-hook, (2) Off-hook, and (3) Busied out. Each position is permanently associated with a line so that a position maintains memory of the status of that line. A second memory 642 provides line assignment memory, this memory having one bit of information in each of its 128 positions. Memory 642 serves as the last-look storage against which the present condition of the remote line can be checked by the demand circuitry 644 to demand a channel assignment from the memory 34. A three-state flip-flop 646 provides control timing for the memory 640. A final circuit 648 which includes a five-bit latch register and magnitude comparator acts to rotate the channels being assigned to handle calls.

The remote TDS unit 64 directs channel and line scan information from the timing equipment to the appropriate line unit shelf of the remote terminal in the system. One remote TDS unit is required in each remote terminal.

Figure 12:
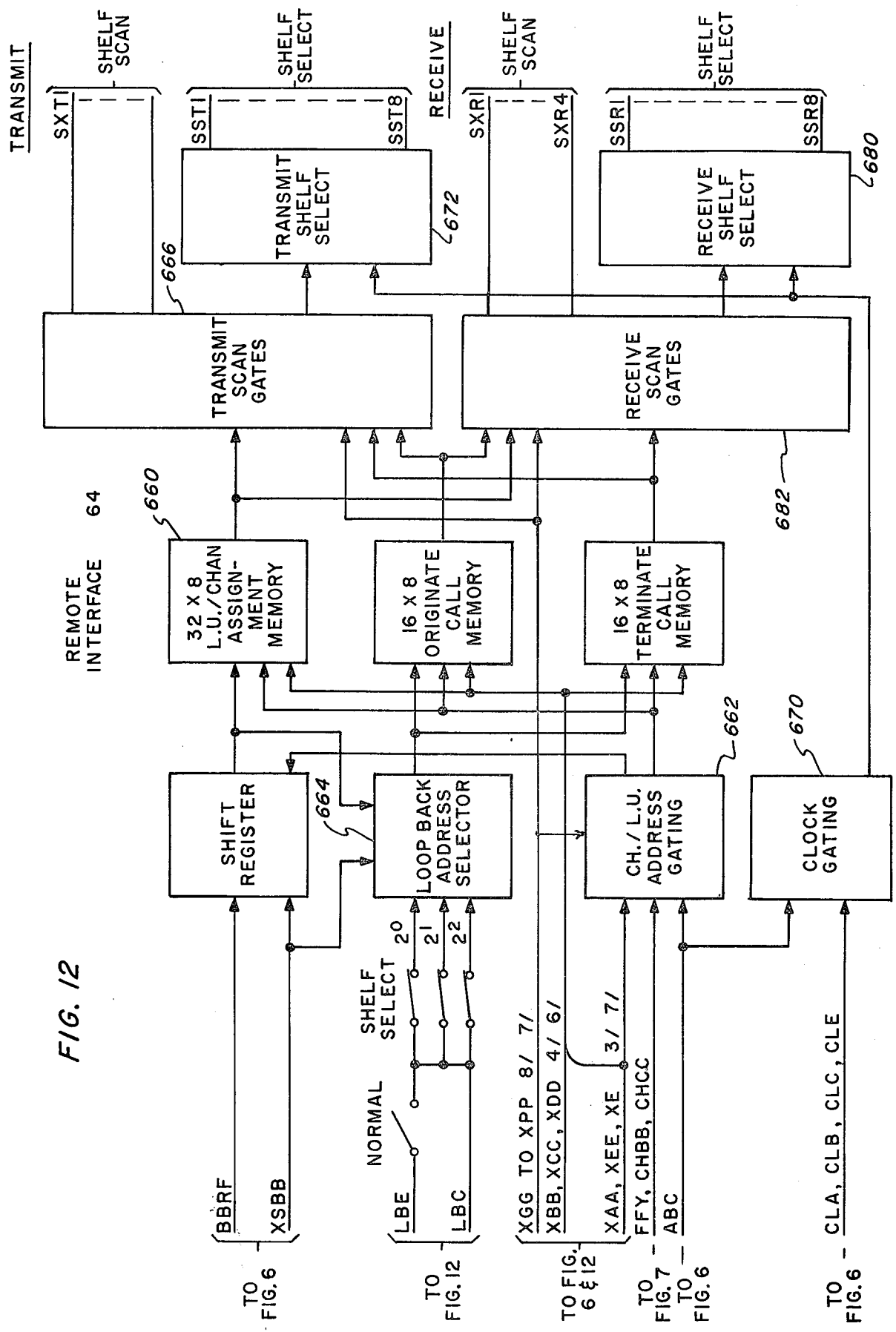
FIG. 12 is a block diagram of a remote terminal TDS unit of FIG. 1.

The remote terminal TDS unit of FIG. 12 is essentially comprised of memories and gates. A memory 660 is provided for storing the addresses of line units in the channel positions with which they are associated. This memory is a 32-position, eight-bit memory with permanent association of channel time slots with memory position for the storage of eight-bit addresses.

The remote TDS unit 64 directs line unit selection information to the appropriate line unit shelves through proper gating logic 670 and combines line and channel scan information. A loopback test circuit 664 is also provided.

A maximum of eight line unit shelves may be equipped in a given remote terminal. Each shelf can hold up to 16 line units. Thus the system capacity is 128 lines. Since only 32 channels are available for 128 lines, each channel may be considered as being shared by up to four lines. Every unused line has equal access to any unavailable channel.

Inputs to the CO interface unit 32 on leads XAA through XEE provide the channel address codes and leads XGG through XNN provide the line unit address scanning codes. These codes are processed to develop the shelf scan and shelf select outputs, SX and SS respectively through the transmit scan gates 604 and receive scan gates 682.

Outputs on the shelf scan leads (SX) determine which of the 16 line units in a given shelf is to be enabled. The shelf select (SS) leads determine which of the possible eight line unit shelves is activated during a given time period.

Inputs XT1 through XT8 provide line unit address codes assigned to each of the 32 channel positions and are used to control the assignment of line units at the CO terminal.

Figure 9C:
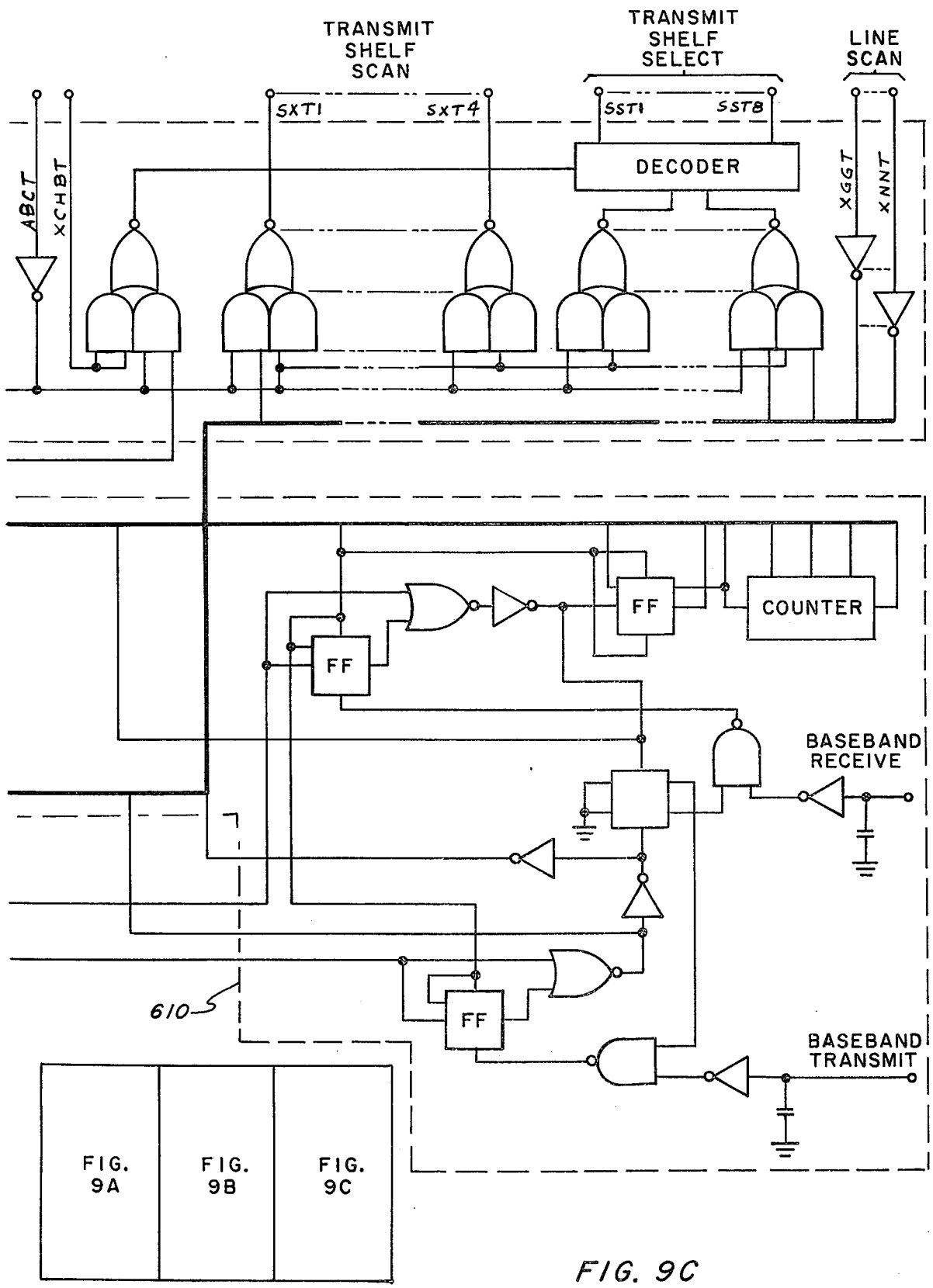
FIG. 9 is a chart showing the placement of FIGS. 9A, 9B and 9C to form a circuit diagram in greater detail of the interface unit of the block diagram of FIGS. 1 and 8.
Figure 9A:
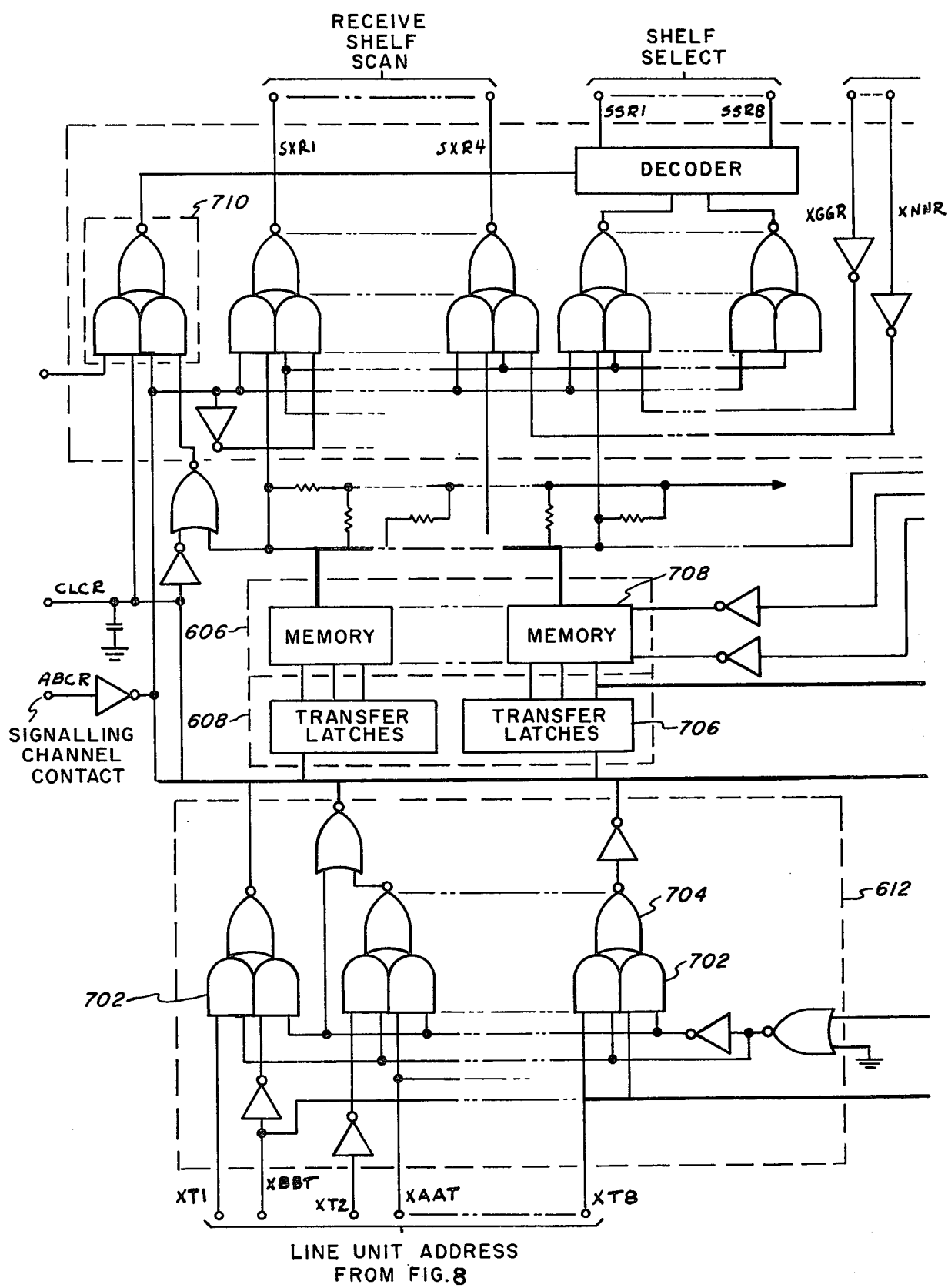
Figure 9B:
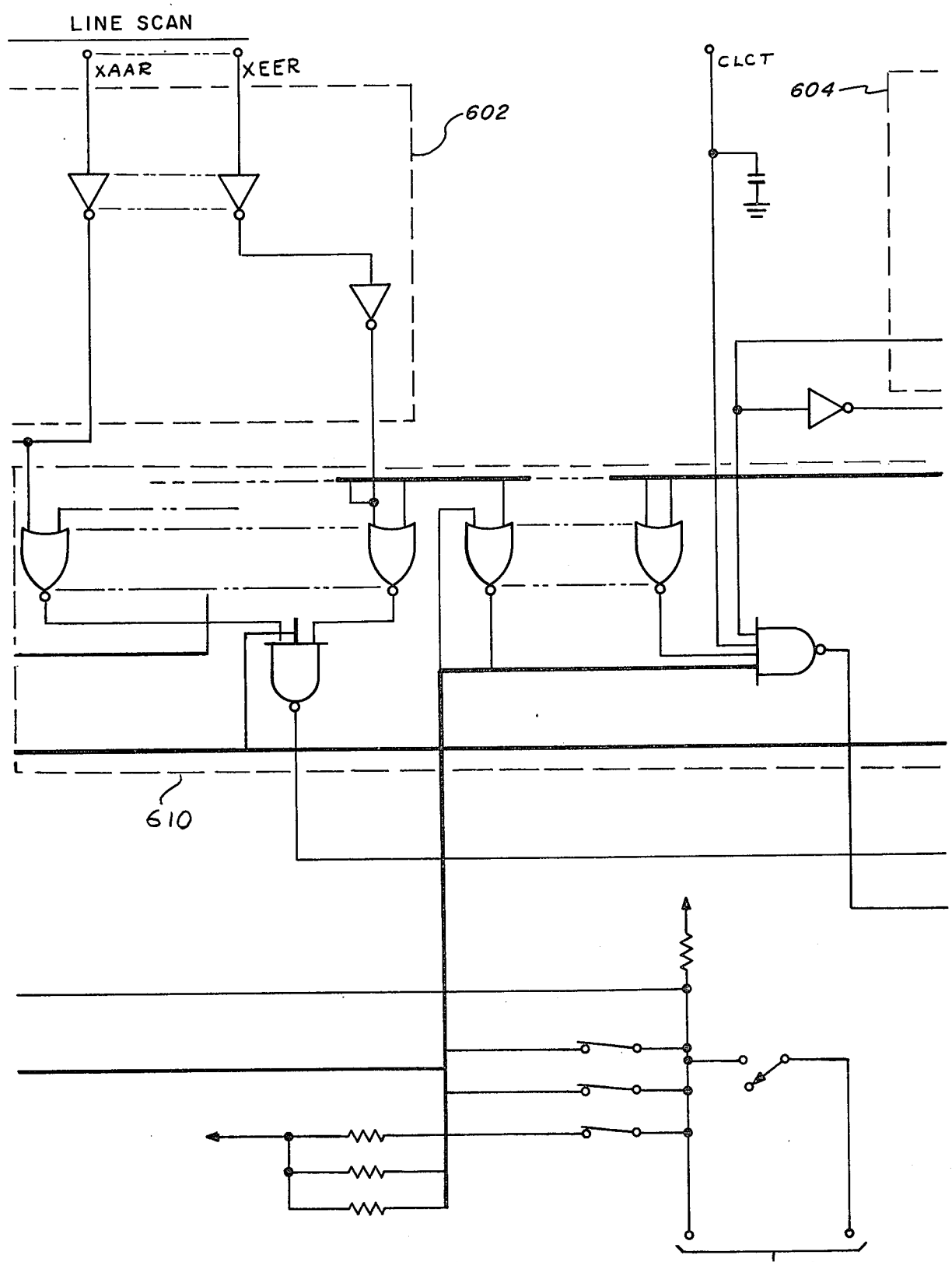

In FIG. 9, I show in greater detail the interface circuit 32 of FIG. 8. This circuit receives line unit selection addresses for insertion in the channels and for use in loop back testing. This data is sent through multiple AND gates 702 feeding OR gates 704 which in turn provide timed signals to transfer latches 706. The output of the transfer latches in turn provide write indications for the 8×32 memory 708 for transmission through multiple AND to OR gates 710 to the shelf scanner for the receive direction. These gates provide one stage of coding and decoding for the various shelf scan units.

The logic for control of transfer of information is completed through the flip-flop and gating arrangement of control 610.

In FIG. 10, I show in greater detail the CO control which receives line unit addresses on leads XFFR to XNNR and feeds these through multiple AND to OR gates 750 for the receive direction and leads XGGT-XNNT for the transmit direction. Two memories are provided — one a two-bit per line memory to store three conditions of the line and the other with one bit per line for line assignment, both memories having a position for each line. Each such memory has a four unit latch register for recirculating internal information.

As mentioned, channel demand from any CO line unit is received on lead XCDML to gate 752 and an indication of the demand is sent to the memory unit 34 on lead XCDMC. Input from the channel addresses XAAT-XEET to latch register 754 and the associated magnitude comparator assures that the channels are rotated for each selection.

In FIG. 11, I show details of the memory unit 34 which receives channel input on lead XCDMC to multiple AND gate 802 to initiate a channel status check in the 8×32 memories. A line assigned signal on lead XLAMO acts with the channel input to AND gate 802 to provide an instantaneous indication on flip-flop 804 as to whether a channel has been assigned or not. Once a channel has been assigned, an indication of that channel is sent to the memory. The memory stores the line identification addresses in its thirty-two positions. The gates and shift register 810 and 812 serve as a parallel-to-series converter for transmission of timing transmission to the line.

The remote terminal TDS unit 64 shown in FIG. 12 is somewhat similar to the interface 32 at the CO combined with some features of the memory unit 34. The remote TDS unit directs channel and line scan information from the timing equipment to the appropriate line unit shelf of the remote terminal. One remote unit is required per remote terminal.

The remote TDS unit directs line unit selection information to the appropriate line unit shelves for both transmit and receive and combines line and channel scan information.

Inputs on leads XAA through XEE to the remote TDS unit of FIG. 12 provide the channel address codes and leads XGG through XNN provide the line unit address scanning codes. These codes are processed to develop the shelf scan and shelf select outputs SX and SS respectively through the transmit scan gates 666.

Outputs on the shelf scan leads (SX) determine which of the 16-line units in a given shelf is to be enabled by combining signals from the clock gating circuit 670 with transmit shelf select gates 672. The shelf select (SS) leads determine which of the possible eight line unit shelves is activated during a given time period.

A similar pattern is used for the receive direction with receive shelf select gating 680, and scan gates 682. Baseband signals received on lead BBRF pass into the shift register 684 which provides a series-to-parallel conversion on data for memory updating control. The address gating circuitry 662 controls the transfer of information into the shift register and from the shift register into the memories.

Adjacent line units in a selected line unit shelf can be looped to each other for test purposes for operation of the shelf select and loop-back/normal switches. Switches S2, S3 and S4 are the shelf select switches and S1 is the loop-back/normal switch.

To loop back the line units in a given shelf, the shelf select switches are placed in the open or closed positions in a binary coded representation of the address of the shelf. The loop-back/normal switch is placed in the loopback position and, on the remote alarm unit, the ACO/ON/OFF switch in the ON position.

In the loopback mode, line unit 1 is looped to line unit 2, 3 to 4, etc. in a selected line unit shelf. This permits testing of all local circuitry.

Figure 13:
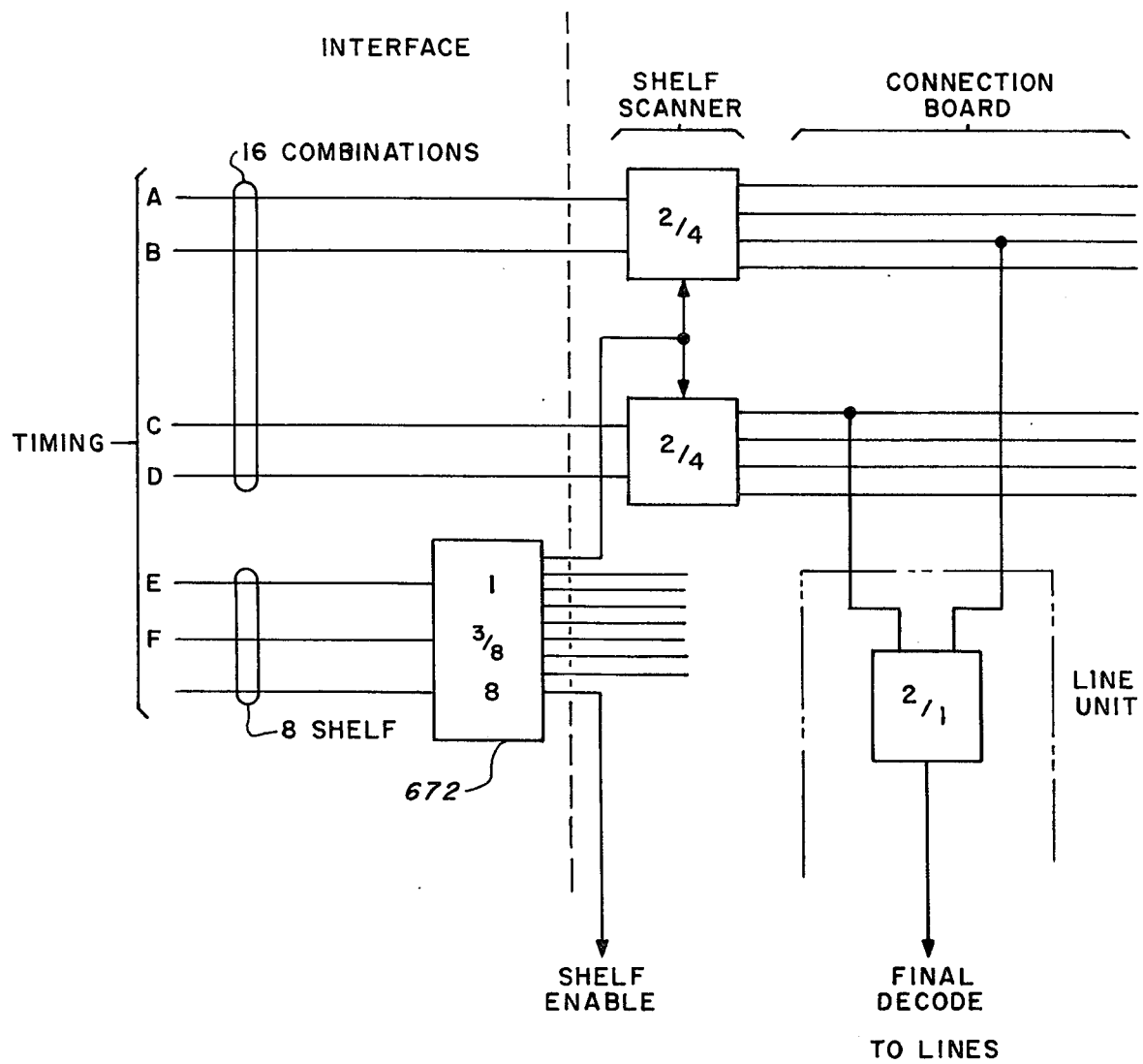
FIG. 13 is a simplified schematic diagram of the stages of coding provided by FIGS. 4 and 6.

In FIG. 13, I show schematically the interaction of the interface, shelf scanner and line unit to produce the address coding combinations with a minimum of intercircuit wiring. The coding arrangement also isolates the sections of the system by the use of the shelf scanners and decoding. By the use of this isolation technique, the need for shielding against crosstalk in adjacent wires is significantly reduced. This technique eases the problems associated with the distribution of high frequency signals to line unit positions on up to eight motherboards located at distances of up to several feet.

As mentioned previously, address information is provided and transmitted in eight bits, seven bits for the information itself and one control bit. Within the interface stage, three of the seven bits are fed into a three to eight decoder. These three are the three most significant bits and provide the shelf address information to the various shelf scanners. The remaining four bits with 16 combinations are separated with two bits directed to one group of 2 to 4 decoders and the other two bits to a second group of the 2 to 4 decoders, with an interface output lead activating both decoders in a group located in each shelf scanner.

In the shelf scanners a two to four code conversion takes place to provide line unit identification. One lead from each shelf scanner group of four outputs is passed to each line unit with a two to one decoding occurring in each line unit. In this way, the shelf scanners act as a buffer and isolator stage in the coding and decoding process at the same time minimizing shelf interconnection wiring.

Figure 14:
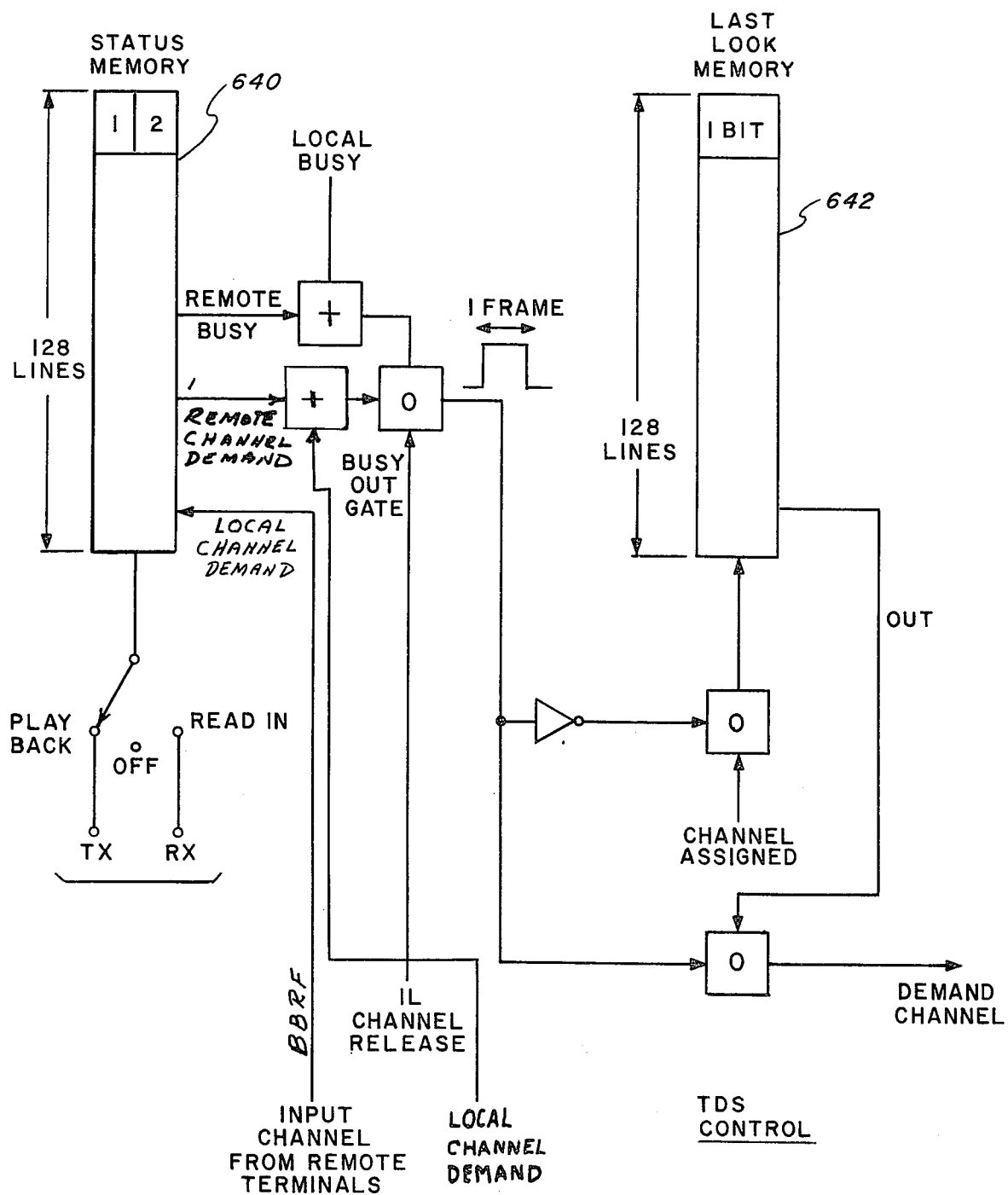
FIG. 14 is a simplified schematic diagram of the line scan within the control unit of FIG. 8.

In FIG. 14, I show schematically, the use of memory within the time division control unit to provide the time division switching and control for the lines. The memory within the time division memory (FIGS. 8 and 11) are used to store the address of a line within the proper channel position. These memory storage indications are controlled from the control unit and its memories.

The control includes a 128 position, two-bit memory 640 with each position permanently associated with a line. These bits represent three line conditions: On-hook, off-hook or busied out. A second memory 642 for 128 positions, one bit wide is used for on-hook, off hook last-look scan comparison. A full scan of the 128 lines for receive is undertaken at which time the control timing switches the scan to the transmit timing mode. Since a line can be seized from either end, a check is instituted of the remote terminal for an off-hook check. Demand from a local line is indicated by ringing current. Input to the line status memory is received on lead BBRF from the remote terminals. The condition of the remote line if off-hook or busy is compared against the local line status and further, to see whether the line has been busied out in other ways to generate a channel demand. When a channel demand indication is received, it is compared in the last-look memory to determine whether the demand has been previously satisfied or whether to forward such a demand to the next available channel in the channel memory.

This comparison is made while the status memory 640 is in the playback or transmit timing mode. When memory 640 is in the receive mode, all other circuitry of the TDS is in an idle state with the other memories storing the system status as determined at the completion of the last playback mode or "information processing" cycle.

As mentioned, the line scan requires a full group interval for the transmit direction and a group interval for the receive direction, a group being 320 frames. A line scan thus occurs over a comparatively long interval during which each line scan may occur, the channel scan intervals being minor subdivisions of the line scan interval.

It should be noted that no detailed showing has been made of the alarm circuitry as being outside the scope of the invention described herein.

CALL FROM REMOTE SUBSCRIBER

When a subscriber at a remote terminal lifts his handset to close his subscriber loop, the line unit coupled to that subscriber responds to the closed loop by operating the K relay in the line unit. The relay causes a bit to be sent by the line unit gating when that line unit is next selected by the shelf scanner unit. The shelf scanner then passes the bit, now identified with the particular line unit and the line is assigned to an available channel, to the remote timing unit where it is passed to the CO terminal via the span line.

The CO terminal processes the signal through to the appropriate line unit causing the off-hook lamp of that unit to light. The K relay in the CO line unit for the calling line operates, causing the CO equipment to recognize the off-hook condition and return dial tone. The dial tone is then transmitted over the channel in the same manner as speech.

On recognition of the dial tone, the subscriber dials, making and breaking the loop (or sending multifrequency tones). The K relay at the subscriber's (remote terminal) line units follows these pulses, again sending pulse bits to the CO equipment. The CO line unit transmits the pulse bits to the office equipment. The CO equipment detects the dialed information, determines the status of the called party (free or busy) and returns busy or ring tone, over the appropriate channel, to the calling subscriber.

CALL FROM C.O. TO REMOTE SUBSCRIBER

At the CO, the line unit status is known by the status of the K relay in the CO line unit. If the line unit is idle, the CO equipment can apply ringing voltage to the two-wire line. The ring voltage is detected by the ring detector circuit 519 in the CO line unit which then drives the off-hook/ring lamp on the CO line unit, and when the channel select time period occurs, and transmits the ring information to the remote terminal.

At the remote terminal, the called line unit is identified and selected and the ring is detected. This causes the busy lamp to light and operates a K relay in the called remote line unit relay. The relay operation closes the ringing circuit causing ringing voltage to be applied to the two-wire drop and opens the circuit to the hybrid. The latter action prevents ringback to the calling party and protects the line unit circuitry from the ringing voltage. When the called party answers, the K relay is operated giving an off-hook indication that is transmitted to the CO equipment which terminates the ringing.

Call processing between a calling and called line is effected through the CO equipment in the conventional manner in either case.

While there has been described what is at present thought to be the preferred embodiment of the invention, it is understood that modifications may be made therein, and it is intended to cover in the appended claims all such modifications which fall within the true spirit and scope of the invention.

I claim:

1. A digital multiplexer for interfacing between a central office and one or more remote terminals over a span line in which the span line transmits in alternate mark inversion, bi-polar form, the invention comprising timing control means at said central office, said timing control means including means for generating multiplex frames comprised of $n$ channels, said $n$ channels being subdivided into $m$ signalling channels and $n-m$ data channels, means operable to produce a bipolar violation within the $m$ channels of certain predetermine ones of said frames, means in each remote terminal for detecting the bipolar violation and for feeding a signal based on said violation to timing control means in said remote terminals to synchronize the timing at said remote terminals with the timing from said timing control means, and means in each remote terminal responsive to said detected violation pulses for storing said violation in a channel for further checking of said synchronizing pulses.

2. A multiplexer as claimed in claim 1, wherein each of said remote terminals includes line units adapted to be connected to subscriber station instruments, and in which each of said line units includes a modem for receiving and transmitting data over said $n-m$ channels.

3. A digital multiplexer as claimed in claim 1, in which said central office includes received signal timing control means, a first input path to said received signal timing means from said span line for receiving signalling and data information therefrom, and a second input path from said timing control means for synchronizing channel signals and frame signals received from the span line with signals received on said second input path.

4. A digital multiplexer as claimed in claim 3 wherein data information in said $n-m$ channels passes through said timing control means for channel alignment therein prior to passage of said information to said span line 5. A time division concentrator state for a digital multiplexer having a central office terminal and a plurality of remote terminals coupled thereto over a span line for coupling of individual line units in the CO terminal with like line units in said remote terminal over plural data channels, said concentrator stage including a first memory with a position for each of said channels and each of the channel positions having storage capacity for addresses of line units coupled together through the channel over said span line, and second and third memories with a position for each line unit in both said second and third line units, said second memory including in each position data concerning the status of the line unit of that position for comparison with data in said third memory, said third memory comprising a storage of the last-look status of the same line unit, and means responsive to the comparison between status on said second and third memories indicating a channel need for allocating an available channel for effecting said line unit to line unit coupling, and wherein said concentrator stage includes a fourth memory receptive of information from a scan of said line units and of information from a scan of said channels for associating a line unit with a channel in said first memory.

6. A concentrator as claimed in claim 5, wherein each remote terminal includes a memory identical to said first memory for maintaining the association of line addresses in channel unit positions in the remote terminals consistent with said central office terminal.

7. A digital multiplexer system for associating a plurality of line units at a central office with a like plurality of line units at respective remote terminals over a plurality of channels, the line units of each remote terminal being grouped into one or more groups comprised of sub groups, the plurality of line units being greater than the plurality of channels, each of said line units having an identifying address, the address comprising a first, second and third plurality of bits of data and further including a control bit, said first plurality of bits determinative of a group of line units at one remote terminal, a first expanding decoder receptive of said first plurality of bits for selecting one of the outputs of said decoder for thereby selecting the group of a wanted line unit, second and third expanding decoders in each sub-group for the second and third plurality of bits for selecting a plurality of line units, including the wanted line unit, and decoding means in each line unit for detecting a wanted line unit from said plurality.

8. A multiplex system as claimed in claim 7, wherein said first plurality of bits comprises three bits, said first expanding decoder comprised a three to eight decoder for a group of up to sixteen line units, and said second and third decoders comprise two to four decoders with an output from said second and third decoders coupled to each line unit for a final stage of decoding therein.

9. A time division concentrator for switching a plurality of lines through respective channels of a bi-directional multiplexer from a central office to subsidiary remote offices, including in said central office a channel memory having a position permanently associated with each channel for temporarily storing in each position the address of a line transmitting or receiving on said channel, a line status memory comprising a plurality of positions each permanently associated with a line for storing an indication of the status of the associated line, means for scanning said line status memory in a receive information mode, to complete a status scan cycle of the lines of the concentrator, a last-look line memory with a position for each line to temporarily store respective indications of the results of the last scan of the memory, means responsive to completion of a scan of said line and line status memories for transferring said line status and last-look memories to a transmit mode to initiate a second scan of said memories, comparing the scanned status in said status memory with a last-look line status memory for initiating a demand for a channel on a difference found in said comparison.

10. A concentrator as claimed in claim 9 wherein there are a plurality of remote terminals coupled through said channels to said multiplexer, means for synchronizing channel frames in said remote terminals with frames in said multiplexer over signalling ones of said channels, means for receiving line and channel association information over said signalling channels, a channel memory at each remote terminal receptive of channel association information from said multiplexer for storage in said remote terminal memory for controlling operations at said remote terminal.

* * * * *